(12) United States Patent
Zhang

(10) Patent No.: US 11,711,837 B2
(45) Date of Patent: Jul. 25, 2023

(54) METHOD AND DEVICE IN A NODE USED FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 244 days.

(21) Appl. No.: 17/179,417

(22) Filed: Feb. 19, 2021

(65) Prior Publication Data

US 2021/0219312 A1 Jul. 15, 2021

Related U.S. Application Data

(63) Continuation of application No. PCT/CN2020/142051, filed on Dec. 31, 2020.

(30) Foreign Application Priority Data

Jan. 14, 2020 (CN) .................. 202010037916.X

(51) Int. Cl.
*H04W 72/00* (2023.01)
*H04W 72/50* (2023.01)

(52) U.S. Cl.
CPC .................. *H04W 72/535* (2023.01)

(58) Field of Classification Search
CPC .... H04L 1/1854; H04L 1/1896; H04L 1/1861
(Continued)

(56) References Cited

U.S. PATENT DOCUMENTS

2019/0173651 A1* 6/2019 Zhang .................. H04L 1/1854
2019/0261361 A1 8/2019 Xiong
(Continued)

FOREIGN PATENT DOCUMENTS

CN 106656440 A * 5/2017 .......... H04L 5/0055
CN 106797283 A 5/2017
WO WO-2018090816 A1 * 5/2018 ............... H04L 1/00

OTHER PUBLICATIONS

Qualcomm Incorporated: "Enhancements to Scheduling and HARQ operation for NR-U", 3GPP Draft; R1-1912940, 3rd Generation Partnership Project (3GPP); vol. RAN WG1, No. Reno, Nevada, USA; Nov. 18, 2019-Nov. 22, 2019 Nov. 9, 2019 (Nov. 9, 2019) URL:https://ftp.3gpp.org/tsg_ran/WG1_RL1/TSGR1_99/Docs/R1-1912940.zip.*
(Continued)

*Primary Examiner* — David Q Nguyen

(57) ABSTRACT

The present disclosure provides a method and a device in a node for wireless communications. A first receiver, which receives a first signaling; receives a first signal; receives a second signaling; and a second signal; a first transmitter, which transmits a first bit block set in a target time-frequency resource group; herein, the first signaling indicates scheduling information of the first signal, while the second signaling indicates scheduling information of the second signal; the first bit block set comprises a first bit block and a third bit block, the first bit block comprises information (bit(s)) indicating whether the first signal is correctly received, a second bit block comprises information (bit(s)) indicating whether the second signal is correctly received; a sum of size of the first bit block and a first value is used together with the first signaling to determine the target time-frequency resource group.

17 Claims, 7 Drawing Sheets

(58) Field of Classification Search
USPC .......................... 370/328, 329, 330, 331, 332
See application file for complete search history.

(56) References Cited

U.S. PATENT DOCUMENTS

| | | | |
|---|---|---|---|
| 2021/0227560 A1* | 7/2021 | Shao | H04W 72/535 |
| 2022/0200831 A1* | 6/2022 | Wu | H04L 1/18 |
| 2022/0264603 A1* | 8/2022 | Yang | H04L 5/0044 |

OTHER PUBLICATIONS

Qualcomm Incorporated Enhancements to Scheduling and HARQ operation for NR-U 3GPP TSG RAN WG1 Meeting #99 R1-1912940 Nov. 8, 2019.
Ericsson on UCI Multiplexing on PUCCH 3GPP TSG RAN WG1 Meeting#92 R1-1802906 Mar. 2, 2018.
CATT UL control enhancements for URLLC 3GPP TSG RAN WG1 Meeting #97 R1-1906328 May 3, 2019.
ISR received in application No. PCT/CN2020/142051 dated Mar. 31, 2021.
First Office Action of Chinses patent application No. CN202010037916.X dated Mar. 22, 2022.
First Search Report of Chinses patent application No. CN202010037916.X dated Mar. 16, 2022.
Notification to Grant Patent Right for Invention of Chinses patent application No. CN202010037916.X dated Sep. 30, 2022.

* cited by examiner

METHOD AND DEVICE IN A NODE USED FOR WIRELESS COMMUNICATION

CROSS REFERENCE TO RELATED APPLICATIONS

This application is a continuation of International Application No. PCT/CN2020/142051, filed Dec. 31, 2020, claims the priority benefit of Chinese Patent Application No. 202010037916.X, filed on Jan. 14, 2020, the full disclosure of which is incorporated herein by reference.

BACKGROUND

Technical Field

The present disclosure relates to transmission methods and devices in wireless communication systems, and in particular to a method and device of radio signal transmission in a wireless communication system that support cellular networks.

Related Art

In a 5G system, in order to support more demanding Ultra Reliable and Low Latency Communication (URLLC) traffic, for example, with higher reliability (e.g., a target BLER of 10^-6) or with lower latency (e.g., 0.5-1 ms), a study item (SI) of New Radio (NR) URLLC advancement was approved at the 3rd Generation Partner Project (3GPP) Radio Access Network (RAN) #80 Plenary. And the 3GPP has also agreed upon introducing data transmissions and Uplink Control Information (UCI) feedbacks of different priorities in URLLC with a view to supporting higher reliability and lower latency requested by URLLC traffics.

SUMMARY

In NR URLLC, the system efficiency can be enhanced by multiplexing UCI feedback of High Priority and UCI feedback of Low Priority (especially Hybrid Automatic Repeat reQuest (HARQ) feedback) on a same channel, such as a Physical Uplink Control CHannel (PUCCH). However, due to varied properties of UCI of different priorities, how to multiplex two UCI feedbacks in a reasonable way remains a problem to be solved.

To address the above problem, the present disclosure provides a solution. It should be noted that though the present disclosure only took the NR URLLC scenario for example in the statement above, it is also applicable to other scenarios confronting the same difficulty, where similar technical effects can be achieved. If no conflict is incurred, embodiments in any node in the present disclosure and the characteristics of the embodiments are also applicable to another node. What's more, the embodiments in the present disclosure and the characteristics in the embodiments can be arbitrarily combined if there is no conflict. Particularly, for interpretations of the terminology, nouns, functions and variants (unless otherwise specified) in the present disclosure, refer to definitions given in TS36 series, TS38 series and TS37 series of 3GPP specifications.

The present disclosure provides a method in a first node for wireless communications, comprising:
receiving a first signaling; receiving a first signal; receiving a second signaling; and receiving a second signal; and
transmitting a first bit block set in a target time-frequency resource group;
herein, the first signaling indicates scheduling information of the first signal, while the second signaling indicates scheduling information of the second signal; the first bit block set comprises a first bit block and a third bit block, the first bit block comprises information (bit(s)) indicating whether the first signal is correctly received, a second bit block comprises information (bit(s)) indicating whether the second signal is correctly received, and the second bit block is used to generate the third bit block; a sum of size of the first bit block and a first value is used together with the first signaling to determine the target time-frequency resource group; the first value is a first parameter, or, the first value is size of the second bit block; the first signaling is used to indicate a first identifier, while the second signaling is used to indicate a second identifier; whether the first identifier is the same as the second identifier is used to determine the first value.

In one embodiment, problems to be solved in the present disclosure include how to determine which one of PUCCH resource sets is selected when UCIs of various priorities are determined to be multiplexed onto a same PUCCH.

In one embodiment, the above method is characterized in that when UCIs of different priorities are determined to be multiplexed onto a same PUCCH, a number of bits in low-priority UCI carried by the PUCCH is restricted.

In one embodiment, the above method is characterized in that when UCIs of different priorities are determined to be multiplexed onto a same PUCCH, a number of bits comprised in high-priority UCI and the first value are jointly used to determine which PUCCH resource set is selected; herein, the first value is used to constrain a number of bits comprised in low-priority UCI.

In one embodiment, the above method is characterized in that when a number of bits comprised in low-priority UCI is greater than the first value, the multiplexed PUCCH only carries part of low-priority UCI.

In one embodiment, the above method is characterized in that when a number of bits comprised in low-priority UCI is greater than the first value, the multiplexed PUCCH only carries part of low-priority HARQ information.

In one embodiment, the above method is advantageous in that when the first value is a statically or semi-statically configured value, the selection of PUCCH does not depend on a number of bits comprised in low-priority UCI, so that high-priority UCI can be transmitted in a more reliable manner.

In one embodiment, the above method is advantageous in that by restricting resources occupied by low-priority UCI on a PUCCH, more resources will be allocated to high-priority UCI for transmitting.

According to one aspect of the present disclosure, the method is characterized in that:
when the first identifier is the same as the second identifier, the first value is the size of the second bit block; when the first identifier is different from the second identifier, the first value is the first parameter.

According to one aspect of the present disclosure, the method is characterized in that:
when the first identifier is the same as the second identifier, the first signaling is a last signaling in a first signaling set, and the first bit block set is related to the first signaling set, the first signaling set comprising the first signaling and the second signaling, and each signaling in the first signaling set being used to indicate the first identifier.

According to one aspect of the present disclosure, the method is characterized in that:

when the first identifier is different from the second identifier, the first signaling is a last signaling in a third signaling set, and the second signaling is a last signaling in a second signaling set, the first bit block is related to the third signaling set, and the second bit block is related to the second signaling set, any signaling in the third signaling set not belonging to the second signaling set, each signaling in the third signaling set is used to indicate the first identifier, while each signaling in the second signaling set is used to indicate the second identifier, the third signaling set comprising a positive integer number of signaling(s), and the second signaling set comprising a positive integer number of signaling(s).

According to one aspect of the present disclosure, the method is characterized in that:

when the first identifier is different from the second identifier, the first identifier indicates high priority, and the second identifier indicates low priority, the first signaling and the size of the first bit block are used to determine a first time-frequency resource group, while the second signaling and the size of the second bit block are used to determine a second time-frequency resource group, the first time-frequency resource group overlapping with the second time-frequency resource group in time domain.

In one embodiment, the above method is characterized in that two Downlink Control Information (DCI) sets respectively indicate different priorities; a last piece of DCI in each DCI set indicates a PUCCH for transmitting UCI; when the two indicated PUCCHs are overlapping in time domain, the two pieces of UCI of different priorities are multiplexed onto a same PUCCH.

According to one aspect of the present disclosure, comprising:

receiving first information;

herein, the first information is used to determine the first parameter.

According to one aspect of the present disclosure, comprising:

receiving second information;

herein, the second information is used to indicate N time-frequency resource group sets, and any one of the N time-frequency resource group sets comprises a positive integer number of time-frequency resource group(s), N being a positive integer greater than 1; the target time-frequency resource group is a time-frequency resource group in a first time-frequency resource group set, the first time-frequency resource group set being one of the N time-frequency resource group sets; a sum of the size of the first bit block and the first value is used to determine the first time-frequency resource group set out of the N time-frequency resource group sets, and the first signaling is used to indicate the target time-frequency resource group from the first time-frequency resource group set.

According to one aspect of the present disclosure, the first node is a UE.

According to one aspect of the present disclosure, the first node is a relay node.

The present disclosure provides a method in a second node for wireless communications, comprising:

transmitting a first signaling; transmitting a first signal; transmitting a second signaling; and transmitting a second signal; and receiving a first bit block set in a target time-frequency resource group;

herein, the first signaling indicates scheduling information of the first signal, while the second signaling indicates scheduling information of the second signal; the first bit block set comprises a first bit block and a third bit block, the first bit block comprises information (bit(s)) indicating whether the first signal is correctly received, a second bit block comprises information (bit(s)) indicating whether the second signal is correctly received, and the second bit block is used to generate the third bit block; a sum of size of the first bit block and a first value is used together with the first signaling to determine the target time-frequency resource group; the first value is a first parameter, or, the first value is size of the second bit block; the first signaling is used to indicate a first identifier, while the second signaling is used to indicate a second identifier; whether the first identifier is the same as the second identifier is used to determine the first value.

According to one aspect of the present disclosure, the method is characterized in that:

when the first identifier is the same as the second identifier, the first value is the size of the second bit block; when the first identifier is different from the second identifier, the first value is the first parameter.

According to one aspect of the present disclosure, the method is characterized in that:

when the first identifier is the same as the second identifier, the first signaling is a last signaling in a first signaling set, and the first bit block set is related to the first signaling set, the first signaling set comprising the first signaling and the second signaling, and each signaling in the first signaling set being used to indicate the first identifier.

According to one aspect of the present disclosure, the method is characterized in that:

when the first identifier is different from the second identifier, the first signaling is a last signaling in a third signaling set, and the second signaling is a last signaling in a second signaling set, the first bit block is related to the third signaling set, and the second bit block is related to the second signaling set, any signaling in the third signaling set not belonging to the second signaling set, each signaling in the third signaling set is used to indicate the first identifier, while each signaling in the second signaling set is used to indicate the second identifier, the third signaling set comprising a positive integer number of signaling(s), and the second signaling set comprising a positive integer number of signaling(s).

According to one aspect of the present disclosure, the method is characterized in that:

when the first identifier is different from the second identifier, the first identifier indicates high priority, and the second identifier indicates low priority, the first signaling and the size of the first bit block are used to determine a first time-frequency resource group, while the second signaling and the size of the second bit block are used to determine a second time-frequency resource group, the first time-frequency resource group overlapping with the second time-frequency resource group in time domain.

According to one aspect of the present disclosure, comprising:

transmitting first information;

herein, the first information is used to determine the first parameter.

According to one aspect of the present disclosure, comprising:

transmitting second information;

herein, the second information is used to indicate N time-frequency resource group sets, and any one of the N time-frequency resource group sets comprises a positive integer number of time-frequency resource group(s), N being a positive integer greater than 1; the target time-frequency resource group is a time-frequency resource group in a first time-frequency resource group set, the first time-frequency resource group set being one of the N time-frequency resource group sets; a sum of the size of the first bit block and the first value is used to determine the first time-frequency resource group set out of the N time-frequency resource group sets, and the first signaling is used to indicate the target time-frequency resource group from the first time-frequency resource group set.

According to one aspect of the present disclosure, the second node is a base station.

According to one aspect of the present disclosure, the second node is a UE.

According to one aspect of the present disclosure, the second node is a relay node.

The present disclosure provides a first node for wireless communications, comprising:

a first receiver, which receives a first signaling; receives a first signal; receives a second signaling;

and receives a second signal; and a first transmitter, which transmits a first bit block set in a target time-frequency resource group;

herein, the first signaling indicates scheduling information of the first signal, while the second signaling indicates scheduling information of the second signal; the first bit block set comprises a first bit block and a third bit block, the first bit block comprises information (bit(s)) indicating whether the first signal is correctly received, a second bit block comprises information (bit(s)) indicating whether the second signal is correctly received, and the second bit block is used to generate the third bit block; a sum of size of the first bit block and a first value is used together with the first signaling to determine the target time-frequency resource group; the first value is a first parameter, or, the first value is size of the second bit block; the first signaling is used to indicate a first identifier, while the second signaling is used to indicate a second identifier; whether the first identifier is the same as the second identifier is used to determine the first value.

The present disclosure provides a second node for wireless communications, comprising:

a second transmitter, which transmits a first signaling; transmits a first signal; transmits a second signaling; and transmits a second signal;

a second receiver, which receives a first bit block set in a target time-frequency resource group;

herein, the first signaling indicates scheduling information of the first signal, while the second signaling indicates scheduling information of the second signal; the first bit block set comprises a first bit block and a third bit block, the first bit block comprises information (bit(s)) indicating whether the first signal is correctly received, a second bit block comprises information (bit(s)) indicating whether the second signal is correctly received, and the second bit block is used to generate the third bit block; a sum of size of the first bit block and a first value is used together with the first signaling to determine the target time-frequency resource group; the first value is a first parameter, or, the first value is size of the second bit block; the first signaling is used to indicate a first identifier, while the second signaling is used to indicate a second identifier; whether the first identifier is the same as the second identifier is used to determine the first value.

In one embodiment, the present disclosure has the following advantages compared with prior art:

When the first value is a static or semi-static value, the selection of PUCCH is not dependent on a number of bits comprised in UCI of low priority, so that UCI of high priority can be transmitted more reliably.

The influence of receiving reliability of low-priority DCI on high-priority UCI feedback is reduced.

By restricting resources occupied by a piece of low-priority UCI on a PUCCH, more resources can be allocated to a piece of high-priority UCI for transmitting.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
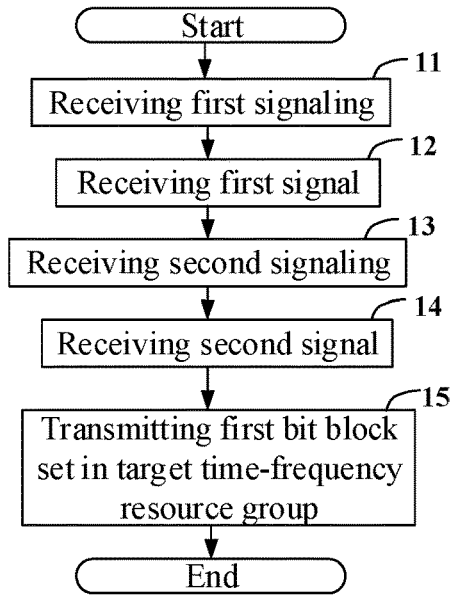
FIG. 1 illustrates a flowchart of processing of a first node according to one embodiment of the present disclosure.

Embodiment 1 illustrates a flowchart of processing of a first node according to one embodiment of the present disclosure, as shown in FIG. 1.

In Embodiment 1, the first node in the present disclosure receives a first signaling in step 11; receives a first signal in step 12; receives a second signaling in step 13; and receives a second signal in step 14; and transmits a first bit block set in a target time-frequency resource group in step 15.

In Embodiment 1, the first signaling indicates scheduling information of the first signal, while the second signaling indicates scheduling information of the second signal; the first bit block set comprises a first bit block and a third bit block, the first bit block comprises information (bit(s)) indicating whether the first signal is correctly received, a second bit block comprises information (bit(s)) indicating whether the second signal is correctly received, and the second bit block is used to generate the third bit block; a sum of size of the first bit block and a first value is used together with the first signaling to determine the target time-frequency resource group; the first value is a first parameter, or, the first value is size of the second bit block; the first signaling is used to indicate a first identifier, while the second signaling is used to indicate a second identifier; whether the first identifier is the same as the second identifier is used to determine the first value.

In one embodiment, the first signal is a baseband signal.

In one embodiment, the first signal is a radio signal.

In one embodiment, the second signal is a baseband signal.

In one embodiment, the second signal is a radio signal.

In one embodiment, the first signaling is dynamically configured.

In one embodiment, the first signaling is a physical layer signaling.

In one embodiment, the first signaling is a DCI signaling.

In one embodiment, the first signaling is a DownLink Grant DCI signaling.

In one embodiment, the first signaling is transmitted on a downlink physical layer control channel (i.e., a downlink channel only capable of carrying a physical layer signaling).

In one subembodiment, the downlink physical layer control channel is a Physical Downlink Control CHannel (PDCCH).

In one subembodiment, the downlink physical layer control channel is a short PDCCH (sPDCCH).

In one subembodiment, the downlink physical layer control channel is a New Radio PDCCH (NR-PDCCH).

In one subembodiment, the downlink physical layer control channel is a Narrow Band PDCCH (NB-PDCCH).

In one embodiment, the first signaling is transmitted on a downlink physical layer data channel (i.e., a downlink channel only capable of carrying physical layer data).

In one subembodiment, the downlink physical layer data channel is a Physical Downlink Shared CHannel (PDSCH).

In one subembodiment, the downlink physical layer data channel is a short PDSCH (sPDSCH).

In one subembodiment, the downlink physical layer data channel is a New Radio PDSCH (NR-PDSCH).

In one subembodiment, the downlink physical layer data channel is a Narrow Band PDSCH (NB-PDSCH).

In one embodiment, the first signaling is DCI format 1_0, for the specific definition of the DCI format 1_0, refer to 3GPP TS38.212, section 7.3.1.2.

In one embodiment, the first signaling is DCI format 1_1, for the specific definition of the DCI format 1_1, refer to 3GPP TS38.212, section 7.3.1.2.

In one embodiment, the second signaling is dynamically configured.

In one embodiment, the second signaling is a physical layer signaling.

In one embodiment, the second signaling is a DCI signaling.

In one embodiment, the second signaling is a DownLink Grant DCI signaling.

In one embodiment, the second signaling is transmitted on a downlink physical layer control channel (i.e., a downlink channel only capable of carrying a physical layer signaling).

In one subembodiment, the downlink physical layer control channel is a PDCCH.

In one subembodiment, the downlink physical layer control channel is an sPDCCH.

In one subembodiment, the downlink physical layer control channel is an NR-PDCCH.

In one subembodiment, the downlink physical layer control channel is an NB-PDCCH.

In one embodiment, the second signaling is transmitted on a downlink physical layer data channel (i.e., a downlink channel only capable of carrying physical layer data).

In one subembodiment, the downlink physical layer data channel is a PDSCH.

In one subembodiment, the downlink physical layer data channel is an sPDSCH.

In one subembodiment, the downlink physical layer data channel is an NR-PDSCH.

In one subembodiment, the downlink physical layer data channel is an NB-PDSCH.

In one embodiment, the second signaling is DCI format 1_0, for the specific definition of the DCI format 1_0, refer to 3GPP TS38.212, section 7.3.1.2.

In one embodiment, the second signaling is DCI format 1_1, for the specific definition of the DCI format 1_1, refer to 3GPP TS38.212, section 7.3.1.2.

In one embodiment, the target time-frequency resource group is reserved for transmission of the first bit block set.

In one embodiment, the target time-frequency resource group is time-frequency resource belonging to an uplink physical layer control channel (i.e., an uplink channel only capable of carrying a physical layer signaling).

In one subembodiment, the uplink physical layer control channel is a Physical Uplink Control CHannel (PUCCH).

In one subembodiment, the uplink physical layer control channel is a short PUCCH (sPUCCH).

In one subembodiment, the uplink physical layer control channel is a New Radio PUCCH (NR-PUCCH).

In one subembodiment, the uplink physical layer control channel is a Narrow Band PUCCH (NB-PUCCH).

In one embodiment, the first time-frequency resource group is reserved for transmission of the first bit block.

In one embodiment, the first time-frequency resource group is time-frequency resource belonging to an uplink physical layer control channel (i.e., an uplink channel only capable of carrying a physical layer signaling).

In one subembodiment, the uplink physical layer control channel is a PUCCH.

In one subembodiment, the uplink physical layer control channel is an sPUCCH.

In one subembodiment, the uplink physical layer control channel is an NR-PUCCH.

In one subembodiment, the uplink physical layer control channel is an NB-PUCCH.

In one embodiment, the second time-frequency resource group is reserved for transmission of the second bit block.

In one embodiment, the second time-frequency resource group is time-frequency resource belonging to an uplink physical layer control channel (i.e., an uplink channel only capable of carrying a physical layer signaling).

In one subembodiment, the uplink physical layer control channel is a PUCCH.

In one subembodiment, the uplink physical layer control channel is an sPUCCH.

In one subembodiment, the uplink physical layer control channel is an NR-PUCCH.

In one subembodiment, the uplink physical layer control channel is an NB-PUCCH.

In one embodiment, the target time-frequency resource group comprises a positive integer number of Resource Element(s) (RE).

In one embodiment, the target time-frequency resource group comprises a positive integer number of multicarrier symbol(s) in time domain, and comprises a positive integer number of subcarrier(s) in frequency domain.

In one embodiment, the first time-frequency resource group comprises a positive integer number of RE(s).

In one embodiment, the first time-frequency resource group comprises a positive integer number of multicarrier symbol(s) in time domain, and comprises a positive integer number of subcarrier(s) in frequency domain.

In one embodiment, the second time-frequency resource group comprises a positive integer number of RE(s).

In one embodiment, the second time-frequency resource group comprises a positive integer number of multicarrier symbol(s) in time domain, and comprises a positive integer number of subcarrier(s) in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises a Cyclic Prefix (CP).

In one embodiment, the first bit block comprises a positive integer number of bit(s).

In one embodiment, the first bit block comprises Hybrid Automatic Repeat reQuest ACKnowledgement (HARQ-ACK) feedback.

In one embodiment, some of bits in the first bit block carry HARQ-ACK feedback.

In one embodiment, all of bits in the first bit block carry HARQ-ACK feedback.

In one embodiment, an end time of transmission of the first signaling is no earlier than an end time of transmission of the second signaling.

In one embodiment, both the first signaling and the second signaling are transmitted in a first time window, the first signaling is transmitted in a first sub-band, while the second signaling is transmitted in a second sub-band, the first sub-band being different from the second sub-band.

In one subembodiment, an index of the second sub-band is smaller than that of the first sub-band.

In one subembodiment, an index of the second sub-band is larger than that of the first sub-band.

In one subembodiment, the first sub-band comprises a carrier, while the second sub-band comprises a carrier.

In one subembodiment, the first sub-band comprises a BandWidth Part (BWP), while the second sub-band comprises a BWP.

In one subembodiment, the first sub-band comprises a Subband, while the second sub-band comprises a Subband.

In one subembodiment, the first time window comprises a slot.

In one subembodiment, the first time window comprises a subframe.

In one subembodiment, the first time window comprises a positive integer number of consecutive multicarrier symbols.

In one subembodiment, the first time window comprises a PDCCH Monitoring Occasion.

In one embodiment, the first signaling is transmitted in a third time window, and the second signaling is transmitted in a second time window, the third time window being different from the second time window.

In one subembodiment, the third time window comprises a slot.

In one subembodiment, the third time window comprises a subframe.

In one subembodiment, the third time window comprises a positive integer number of consecutive multicarrier symbols.

In one subembodiment, the third time window comprises a PDCCH Monitoring Occasion.

In one subembodiment, the second time window comprises a slot.

In one subembodiment, the second time window comprises a subframe.

In one subembodiment, the second time window comprises a positive integer number of consecutive multicarrier symbols.

In one subembodiment, the second time window comprises a PDCCH Monitoring Occasion.

In one embodiment, the second bit block comprises a positive integer number of bit(s).

In one embodiment, the second bit block comprises HARQ-ACK feedback.

In one embodiment, some of bits in the second bit block carry HARQ-ACK feedback.

In one embodiment, all of bits in the second bit block carry HARQ-ACK feedback.

In one embodiment, the third bit block comprises a positive integer number of bit(s).

In one embodiment, the third bit block comprises HARQ-ACK feedback.

In one embodiment, some of bits in the third bit block carry HARQ-ACK feedback.

In one embodiment, all of bits in the third bit block carry HARQ-ACK feedback.

In one embodiment, the first bit block comprises a Part 1 Channel State Information (CSI) Report, for the specific meaning of the Part 1 CSI Report, refer to 3GPP TS38.214, section 5.2.3.

In one embodiment, the first bit block comprises all or part of a Part 2 CSI Report, for the specific meaning of the Part 2 CSI Report, refer to 3GPP TS38.214, section 5.2.3.

In one embodiment, the first bit block comprises a Scheduling Request (SR).

In one embodiment, the third bit block comprises a Part 1 CSI Report, for the specific meaning of the Part 1 CSI Report, refer to 3GPP TS38.214, section 5.2.3.

In one embodiment, the third bit block comprises all or part of a Part 2 CSI Report, for the specific meaning of the Part 2 CSI Report, refer to 3GPP TS38.214, section 5.2.3.

In one embodiment, the second bit block comprises a Part 1 CSI Report, for the specific meaning of the Part 1 CSI Report, refer to 3GPP TS38.214, section 5.2.3.

In one embodiment, the second bit block comprises all or part of a Part 2 CSI Report, for the specific meaning of the Part 2 CSI Report, refer to 3GPP TS38.214, section 5.2.3.

In one embodiment, the second bit block comprises an SR.

In one embodiment, the third bit block comprises an SR.

In one embodiment, the phrase that the second bit block is used to generate the third bit block includes that the third bit block comprises the second bit block.

In one embodiment, the phrase that the second bit block is used to generate the third bit block includes that the third bit block comprises some bits in the second bit block.

In one embodiment, the phrase that the second bit block is used to generate the third bit block includes that the third bit block comprises bits generated through bundling of all or some bits comprised in the second bit block.

In one embodiment, the size of the third bit block is the first value.

In one embodiment, the first signal is transmitted on a PDSCH.

In one embodiment, the first signal is transmitted on an sPDSCH.

In one embodiment, the first signal is transmitted on an NR-PDSCH.

In one embodiment, the first signal is transmitted on an NB-PDSCH.

In one embodiment, the second signal is transmitted on a PDSCH.

In one embodiment, the second signal is transmitted on an sPDSCH.

In one embodiment, the second signal is transmitted on an NR-PDSCH.

In one embodiment, the second signal is transmitted on an NB-PDSCH.

In one embodiment, the scheduling information of the first signal comprises one or more of occupied time-domain resource, occupied frequency-domain resource, a Modulation and Coding Scheme (MCS), configuration information of Demodulation Reference Signals (DMRS), a HARQ process ID, a Redundancy Version (RV), an NDI or a priority.

In one embodiment, the scheduling information of the second signal comprises one or more of occupied time-domain resource, occupied frequency-domain resource, an MCS, configuration information of DMRS, a HARQ process ID, an RV, an NDI or a priority.

Embodiment 2

Figure 2:
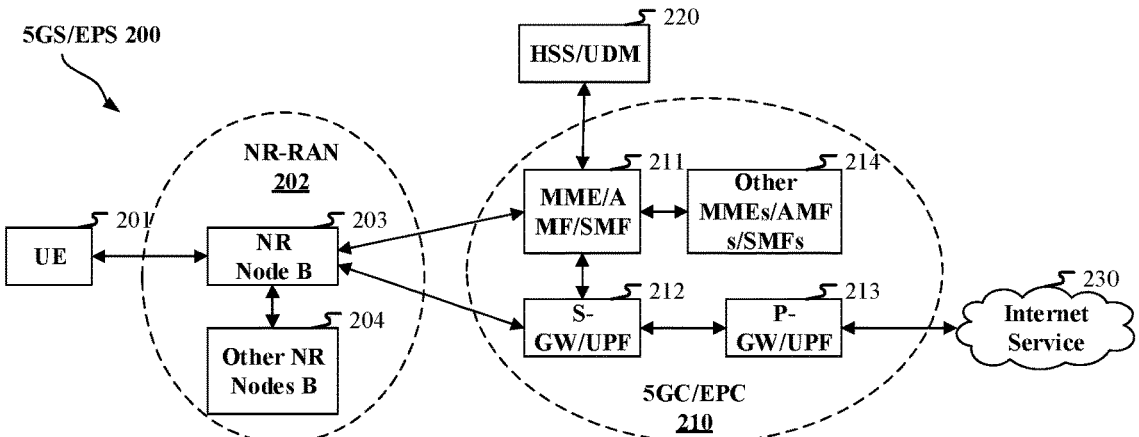
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE), and Long-Term Evolution Advanced (LTE-A) systems. The 5G NR or LTE network architecture 200 may be called a 5G System/Evolved Packet System (5GS/EPS) 200 or other appropriate terms, which may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPS), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW) 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the first node in the present disclosure includes the UE 201.

In one embodiment, the second node in the present disclosure includes the gNB 203.

In one subembodiment, the UE 201 supports MIMO wireless communications.

In one subembodiment, the gNB 203 supports MIMO wireless communications.

Embodiment 3

Figure 3:
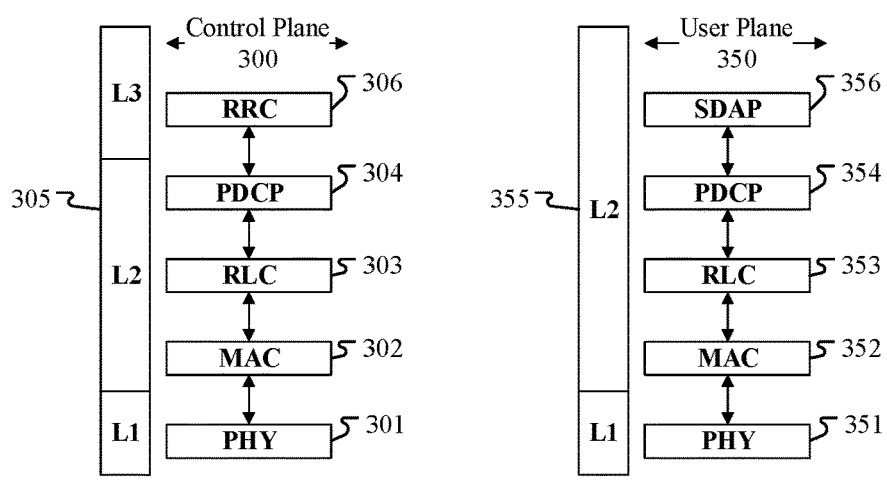
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3.

Embodiment 3 illustrates a schematic diagram of an embodiment of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 305, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the RRC sublayer 306.

In one embodiment, the first information in the present disclosure is generated by the MAC sublayer 302.

In one embodiment, the second information in the present disclosure is generated by the RRC sublayer 306.

In one embodiment, the second information in the present disclosure is generated by the MAC sublayer 302.

In one embodiment, the first signaling in the present disclosure is generated by the PHY301 or the PHY351.

In one embodiment, the first signal in the present disclosure is generated by the PHY301 or the PHY351.

In one embodiment, the second signaling in the present disclosure is generated by the PHY301 or the PHY351.

In one embodiment, the second signal in the present disclosure is generated by the PHY301 or the PHY351.

Embodiment 4

Figure 4:
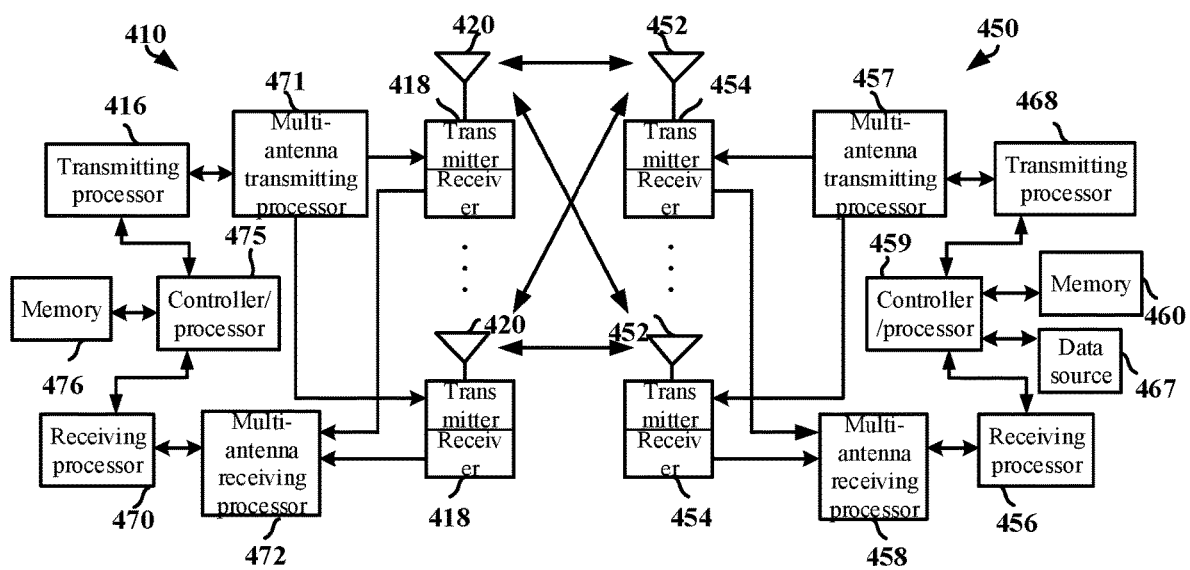
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. In DL, the controller/processor 475 provides header compression, encryption, packet segmentation and reordering, and multiplexing between a logical channel and a transport channel, and radio resource allocation of the second communication device 450 based on various priorities. The controller/processor 475 is also in charge of HARQ operation, a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and constellation mapping according to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In DL, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing. The controller/processor 459 is also in charge of error detection employing ACK and/or NACK protocols so as to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides de-multiplexing between a transport channel and a logical channel, packet reassembling, decrypting, header decompression, control signal processing so as to recover a higher-layer packet from the second communication device 450. The higher-layer packet coming from the controller/processor 475 may be provided to the core network. The controller/processor 475 is also in charge of error detection employing ACK and/or NACK protocols so as to support HARQ operation.

In one embodiment, the second communication device 450 comprises at least one processor and at least one memory, the at least one memory comprises computer program codes; the at least one memory and the computer program codes are configured to be used in collaboration with the at least one processor, the second communication device 450 at least transmits the first signaling in the present disclosure; transmits the first signal in the present disclosure; transmits the second signaling in the present disclosure; and transmits the second signal in the present disclosure; and receives the first bit block set of the present disclosure in the target time-frequency resource group of the present disclosure. The first signaling indicates scheduling information of the first signal, while the second signaling indicates scheduling information of the second signal; the first bit block set comprises a first bit block and a third bit block in the present disclosure, the first bit block comprises information (bit(s)) indicating whether the first signal is correctly received, the second bit block in the present disclosure comprises information (bit(s)) indicating whether the second signal is correctly received, and the second bit block is used to generate the third bit block; a sum of the size of the first bit block and the first value in the present disclosure is used together with the first signaling to determine the target time-frequency resource group; the first value is the first parameter in the present disclosure, or, the first value is the size of the second bit block; the first signaling is used to indicate the first identifier in the present disclosure, while the second signaling is used to indicate a second identifier in the present disclosure; whether the first identifier is the same as the second identifier is used to determine the first value.

In one embodiment, the second communication device 450 comprises a memory that stores computer readable instruction program, the computer readable instruction program generates actions when executed by at least one processor, which include: transmitting the first signaling in the present disclosure; transmitting the first signal in the present disclosure; transmitting the second signaling in the present disclosure; and transmitting the second signal in the present disclosure; and receiving the first bit block set of the present disclosure in the target time-frequency resource group of the present disclosure. The first signaling indicates scheduling information of the first signal, while the second signaling indicates scheduling information of the second signal; the first bit block set comprises a first bit block and a third bit block in the present disclosure, the first bit block comprises information (bit(s)) indicating whether the first signal is correctly received, the second bit block in the present disclosure comprises information (bit(s)) indicating whether the second signal is correctly received, and the second bit block is used to generate the third bit block; a sum of the size of the first bit block and the first value in the present disclosure is used together with the first signaling to determine the target time-frequency resource group; the first value is the first parameter in the present disclosure, or, the first value is the size of the second bit block; the first signaling is used to indicate the first identifier in the present disclosure, while the second signaling is used to indicate a second identifier in the present disclosure; whether the first identifier is the same as the second identifier is used to determine the first value.

In one embodiment, the first communication device 410 comprises at least one processor and at least one memory, the at least one memory comprises computer program codes; the at least one memory and the computer program codes are configured to be used in collaboration with the at least one processor. The first communication device 410 at least receives the first signaling in the present disclosure; receives the first signal in the present disclosure; receives the second signaling in the present disclosure; and receives the second signal in the present disclosure; and transmits the first bit block set of the present disclosure in the target time-frequency resource group of the present disclosure. The first signaling indicates scheduling information of the first signal, while the second signaling indicates scheduling information of the second signal; the first bit block set comprises a first bit block and a third bit block in the present disclosure, the first bit block comprises information (bit(s)) indicating whether the first signal is correctly received, the second bit block in the present disclosure comprises information (bit(s)) indicating whether the second signal is correctly received, and the second bit block is used to generate the third bit block; a sum of the size of the first bit block and the first value in the present disclosure is used together with the first signaling to determine the target time-frequency resource group; the first value is the first parameter in the present disclosure, or, the first value is the size of the second bit block; the first signaling is used to indicate the first identifier in the present disclosure, while the second signaling is used to indicate a second identifier in the present disclosure; whether the first identifier is the same as the second identifier is used to determine the first value.

In one embodiment, the first communication device 410 comprises a memory that stores computer readable instruction program, the computer readable instruction program generates actions when executed by at least one processor, which include: receiving the first signaling in the present disclosure; receiving the first signal in the present disclosure; receiving the second signaling in the present disclosure; and receiving the second signal in the present disclosure; and transmitting the first bit block set of the present disclosure in the target time-frequency resource group of the present disclosure. The first signaling indicates scheduling information of the first signal, while the second signaling indicates scheduling information of the second signal; the first bit block set comprises a first bit block and a third bit block in the present disclosure, the first bit block comprises information (bit(s)) indicating whether the first signal is correctly received, the second bit block in the present disclosure comprises information (bit(s)) indicating whether the second signal is correctly received, and the second bit block is used to generate the third bit block; a sum of the size of the first bit block and the first value in the present disclosure is used together with the first signaling to determine the target time-frequency resource group; the first value is the first parameter in the present disclosure, or, the first value is the size of the second bit block; the first signaling is used to indicate the first identifier in the present disclosure, while the second signaling is used to indicate a second identifier in the present disclosure; whether the first identifier is the same as the second identifier is used to determine the first value.

In one embodiment, the first node in the present disclosure includes the first communication device 410.

In one embodiment, the second node in the present disclosure includes the second communication device 450.

In one embodiment, the second communication device 450 is a UE.

In one embodiment, the second communication device 450 is a base station.

In one embodiment, the first communication device 410 is a UE.

In one embodiment, at least one of the antenna 420, the receiver 418, the receiving processor 470, the multi-antenna receiving processor 472, the controller/processor 475 or the memory 476 is used to receive the first signaling in the present disclosure.

In one embodiment, at least one of the antenna 452, the transmitter 454, the transmitting processor 468, the multi-antenna transmitting processor 457, the controller/processor 459, the memory 460 or the data source 467 is used to transmit the first signaling in the present disclosure.

In one embodiment, at least one of the antenna 420, the receiver 418, the receiving processor 470, the multi-antenna receiving processor 472, the controller/processor 475 or the memory 476 is used to receive the first signal in the present disclosure.

In one embodiment, at least one of the antenna 452, the transmitter 454, the transmitting processor 468, the multi-antenna transmitting processor 457, the controller/processor 459, the memory 460 or the data source 467 is used to transmit the first signal in the present disclosure.

In one embodiment, at least one of the antenna 420, the receiver 418, the receiving processor 470, the multi-antenna receiving processor 472, the controller/processor 475 or the memory 476 is used to receive the second signaling in the present disclosure.

In one embodiment, at least one of the antenna 452, the transmitter 454, the transmitting processor 468, the multi-antenna transmitting processor 457, the controller/processor 459, the memory 460 or the data source 467 is used to transmit the second signaling in the present disclosure.

In one embodiment, at least one of the antenna 420, the receiver 418, the receiving processor 470, the multi-antenna receiving processor 472, the controller/processor 475 or the memory 476 is used to receive the second signal in the present disclosure.

In one embodiment, at least one of the antenna 452, the transmitter 454, the transmitting processor 468, the multi-antenna transmitting processor 457, the controller/processor 459, the memory 460 or the data source 467 is used to transmit the second signal in the present disclosure.

In one embodiment, at least one of the antenna 420, the receiver 418, the receiving processor 470, the multi-antenna receiving processor 472, the controller/processor 475 or the memory 476 is used to receive the first information in the present disclosure.

In one embodiment, at least one of the antenna 452, the transmitter 454, the transmitting processor 468, the multi-antenna transmitting processor 457, the controller/processor 459, the memory 460 or the data source 467 is used to transmit the first information in the present disclosure.

In one embodiment, at least one of the antenna 420, the receiver 418, the receiving processor 470, the multi-antenna receiving processor 472, the controller/processor 475 or the memory 476 is used to receive the second information in the present disclosure.

In one embodiment, at least one of the antenna 452, the transmitter 454, the transmitting processor 468, the multi-antenna transmitting processor 457, the controller/processor 459, the memory 460 or the data source 467 is used to transmit the second information in the present disclosure.

In one embodiment, at least one of the antenna 452, the receiver 454, the receiving processor 456, the multi-antenna receiving processor 458, the controller/processor 459, the memory 460 or the data source 467 is used to receive the first bit block set in the present disclosure.

In one embodiment, at least one of the antenna 420, the transmitter 418, the transmitting processor 416, the multi-antenna transmitting processor 471, the controller/processor 475 or the memory 476 is used to transmit the first bit block set in the present disclosure.

Embodiment 5

Figure 5:
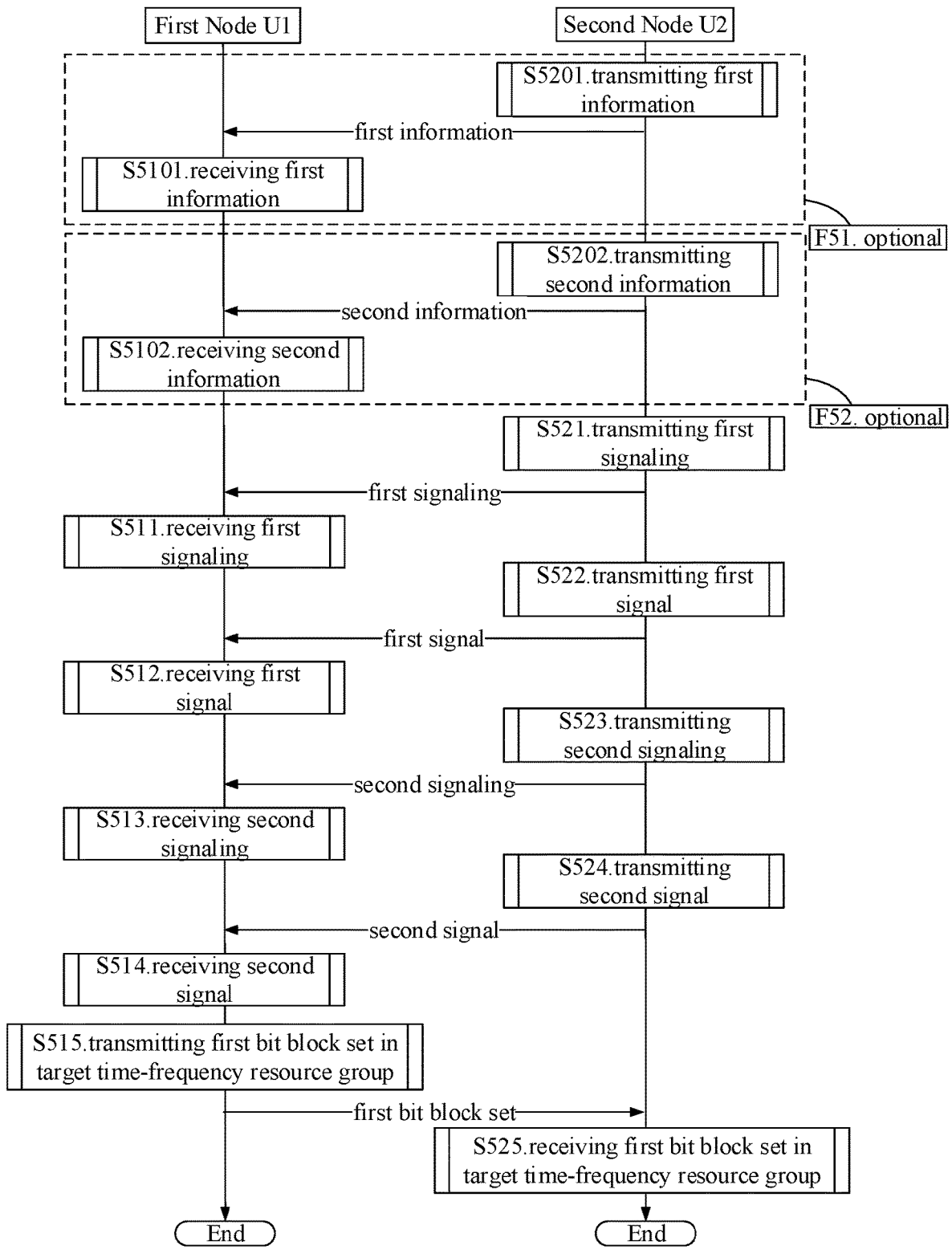
FIG. 5 illustrates a flowchart of wireless transmission according to one embodiment of the present disclosure.

Embodiment 5 illustrates a flowchart of wireless transmission according to one embodiment of the present disclosure, as shown in FIG. 5. In FIG. 5, a first node U1 and a second node U2 are in communication via an air interface. Steps marked by dotted-line boxes F51 and F52 are optional.

The first node U1 receives first information in step S5101; receives second information in step S5102; receives a first signaling in step S511; and receives a first signal in step S512; receives a second signaling in step S513; and receives a second signal in step S514; and transmits a first bit block set in a target time-frequency resource group in step S515.

The second node U2 transmits first information in step S5201; transmits second information in step S5202; transmits a first signaling in step S521; and transmits a first signal in step S522; transmits a second signaling in step S523; and transmits a second signal in step S524; and receives a first bit block set in a target time-frequency resource group in step S525.

In Embodiment 5, the first signaling indicates scheduling information of the first signal, while the second signaling indicates scheduling information of the second signal; the first bit block set comprises a first bit block and a third bit block, the first bit block comprises information (bit(s)) indicating whether the first signal is correctly received, a second bit block comprises information (bit(s)) indicating whether the second signal is correctly received, and the second bit block is used to generate the third bit block; a sum of size of the first bit block and a first value is used together with the first signaling to determine the target time-frequency resource group; the first value is a first parameter, or, the first value is size of the second bit block; the first signaling is used to indicate a first identifier, while the second signaling is used to indicate a second identifier; whether the first identifier is the same as the second identifier is used to determine the first value.

In Embodiment 5, when the first identifier is the same as the second identifier, the first value is the size of the second bit block; when the first identifier is different from the second identifier, the first value is the first parameter; when the first identifier is the same as the second identifier, the first signaling is a last signaling in a first signaling set, and the first bit block set is related to the first signaling set, the first signaling set comprising the first signaling and the second signaling, and each signaling in the first signaling set being used to indicate the first identifier; when the first identifier is different from the second identifier, the first signaling is a last signaling in a third signaling set, and the second signaling is a last signaling in a second signaling set, the first bit block is related to the third signaling set, and the second bit block is related to the second signaling set, any signaling in the third signaling set not belonging to the second signaling set, each signaling in the third signaling set is used to indicate the first identifier, while each signaling in the second signaling set is used to indicate the second identifier, the third signaling set comprising a positive integer number of signaling(s), and the second signaling set comprising a positive integer number of signaling(s); when the first identifier is different from the second identifier, the first identifier indicates high priority, and the second identifier indicates low priority, the first signaling and the size of the first bit block are used to determine a first time-frequency resource group, while the second signaling and the size of the second bit block are used to determine a second time-frequency resource group, the first time-frequency resource group overlapping with the second time-frequency resource group in time domain; the first information is used to determine the first parameter; the second information is used to indicate N time-frequency resource group sets, and any one of the N time-frequency resource group sets comprises a positive integer number of time-frequency resource group(s), N being a positive integer greater than 1; the target time-frequency resource group is a time-frequency resource group in a first time-frequency resource group set, the first time-frequency resource group set being one of the N time-frequency resource group sets; a sum of the size of the first bit block and the first value is used to determine the first time-frequency resource group set out of the N time-frequency resource group sets, and the first signaling is used to indicate the target time-frequency resource group from the first time-frequency resource group set.

In one embodiment, the first node U1 is the first node in the present disclosure.

In one embodiment, the second node U2 is the second node in the present disclosure.

In one embodiment, the first node U1 is a UE.

In one embodiment, the second node U2 is a base station.

In one embodiment, an air interface between the second node U2 and the first node U1 is a Uu interface.

In one embodiment, an air interface between the second node U2 and the first node U1 comprises a cellular link.

In one embodiment, an air interface between the second node U2 and the first node U1 comprises a wireless interface between a base station and a UE.

In one embodiment, the first signal comprises data.

In one embodiment, the first signal comprises data and DMRS.

In one embodiment, the first signal comprises downlink data.

In one embodiment, a transmission channel for the first signal is a Downlink Shared Channel (DL-SCH).

In one embodiment, the second signal comprises data.

In one embodiment, the second signal comprises data and DMRS.

In one embodiment, the second signal comprises downlink data.

In one embodiment, a transmission channel for the second signal is a DL-SCH.

In one embodiment, the first information is semi-statically configured.

In one embodiment, the first information is carried by a higher layer signaling.

In one embodiment, the first information is carried by a Radio Resource Control (RRC) signaling.

In one embodiment, the first information comprises one or more Information Elements (IEs) in an RRC signaling.

In one embodiment, the first information comprises all or part of an IE in an RRC signaling.

In one embodiment, the first information comprises multiple IEs in an RRC signaling.

In one embodiment, the second information is semi-statically configured.

In one embodiment, the second information is carried by a higher layer signaling.

In one embodiment, the second information is carried by an RRC signaling.

In one embodiment, the second information comprises one or more IEs in an RRC signaling.

In one embodiment, the second information comprises all or part of an IE in an RRC signaling.

In one embodiment, the second information comprises multiple IEs in an RRC signaling.

In one embodiment, the first signal carries a first information bit block; and the first signal is obtained by the first information bit block sequentially through part or all of CRC Insertion, Segmentation, Code-Block(CB)-level CRC Insertion, Channel Coding, Rate Matching, Concatenation, Scrambling, Modulation, Layer Mapping, Precoding, Mapping to Resource Element, and OFDM Baseband Signal Generation as well as Modulation and Upconversion.

In one embodiment, the second signal carries a second information bit block; and the second signal is obtained by the second information bit block sequentially through part or all of CRC Insertion, Segmentation, CB-level CRC Insertion, Channel Coding, Rate Matching, Concatenation, Scrambling, Modulation, Layer Mapping, Precoding, Mapping to Resource Element, and OFDM Baseband Signal Generation as well as Modulation and Upconversion.

In one embodiment, the first bit block explicitly indicates whether the first signal is correctly received.

In one embodiment, the first bit block implicitly indicates whether the first signal is correctly received.

In one embodiment, the first bit block carries HARQ-ACK feedback for the first signal.

In one embodiment, some bits comprised in the first bit block carry HARQ-ACK feedback for the first signal.

In one embodiment, all bits comprised in the first bit block carry HARQ-ACK feedback for the first signal.

In one embodiment, the second bit block explicitly indicates whether the second signal is correctly received.

In one embodiment, the second bit block implicitly indicates whether the second signal is correctly received.

In one embodiment, the second bit block carries HARQ-ACK feedback for the second signal.

In one embodiment, some bits comprised in the second bit block carry HARQ-ACK feedback for the second signal.

In one embodiment, all bits comprised in the second bit block carry HARQ-ACK feedback for the second signal.

In one embodiment, the first signaling is used to indicate a Modulation and Coding Scheme (MCS) employed by the first signal in a first MCS set; the first MCS set comprises a positive integer number of MCS(s); the second signaling is used to indicate an MCS employed by the second signal in a second MCS set; the second signal employs a second MCS, and the second MCS set comprises a positive integer number of MCS(s); a target BLER of the first MCS set is smaller than that of the second MCS set.

In one subembodiment, the target BLER of the second MCS set is equal to 0.1, while the target BLER of the first MCS set is one of 0.01, 0.001, 0.00001 and 0.000001.

In one subembodiment, the target BLER of the second MCS set is equal to 0.01, while the target BLER of the first MCS set is one of 0.001, 0.00001 and 0.000001.

In one subembodiment, the target BLER of the second MCS set is equal to 0.001, while the target BLER of the first MCS set is equal to either 0.00001 or 0.000001.

In one subembodiment, the target BLER of the second MCS set is equal to 0.00001, while the target BLER of the first MCS set is equal to 0.000001.

In one embodiment, the first time-frequency resource group and the second time-frequency resource group at least comprise a same OFDM symbol.

In one embodiment, the first time-frequency resource group and the second time-frequency resource group are partially overlapped in time domain.

In one embodiment, the first time-frequency resource group and the second time-frequency resource group are totally overlapped in time domain.

In one embodiment, the steps marked by the box F51 in FIG. 5 exist.

In one embodiment, the steps marked by the box F51 in FIG. 5 do not exist.

In one embodiment, the steps marked by the box F52 in FIG. 5 exist.

In one embodiment, the steps marked by the box F52 in FIG. 5 do not exist.

Embodiment 6

Figure 6:
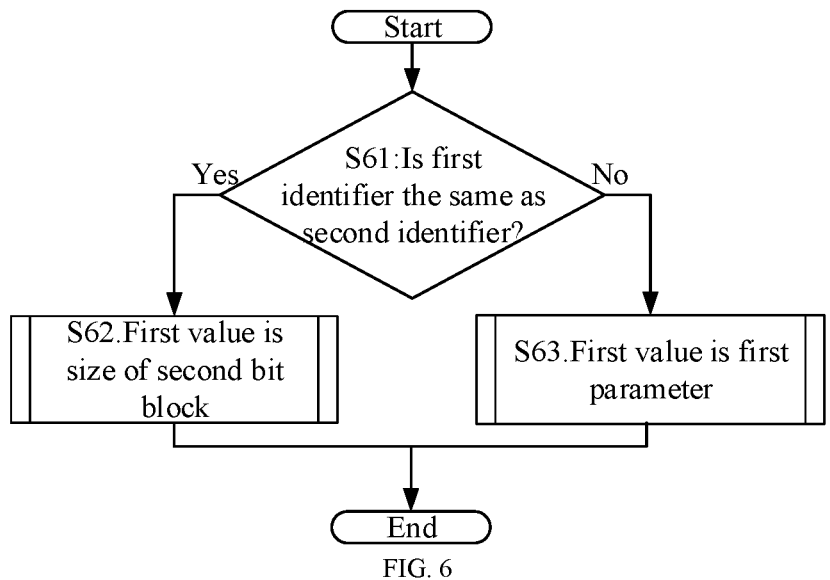
FIG. 6 illustrates a flowchart of determining whether a first value is a first parameter or size of a second bit block according to one embodiment of the present disclosure.

Embodiment 6 illustrates a flowchart of determining whether a first value is a first parameter or size of a second bit block according to one embodiment of the present disclosure, as shown in FIG. 6.

In Embodiment 6, the first node in the present disclosure determines whether a first identifier is the same as a second identifier in step S61; if yes, move forward to step S62 to determine that a first value is the size of a second bit block; if no, move forward to step S63 to determine that the first value is a first parameter.

In one embodiment, the first identifier denotes High Priority.

In one embodiment, the first identifier denotes URLLC transmission.

In one embodiment, the second identifier denotes Low Priority.

In one embodiment, the second identifier denotes eMBB transmission.

In one embodiment, the first identifier and the second identifier respectively indicate different priorities.

In one embodiment, the first identifier and the second identifier are respectively different priority indexes.

In one embodiment, the first identifier and the second identifier are respectively a priority index 0 and a priority index 1.

In one embodiment, the first identifier and the second identifier are respectively a priority index 1 and a priority index 0.

In one embodiment, the first parameter is configured by a higher layer signaling.

In one embodiment, the first parameter is configured by an RRC signaling.

In one embodiment, the first parameter is configured by a MAC CE signaling.

In one embodiment, the first parameter is a default.

In one embodiment, the first parameter is equal to a positive integer.

In one embodiment, the first parameter is equal to 1.

In one embodiment, the first parameter is equal to 2.

In one embodiment, the first parameter is equal to a positive integer no greater than 1706.

In one embodiment, the first signaling in the present disclosure indicates the first parameter.

In one embodiment, the first parameter is a value in a first parameter set, and the first parameter set is configured by a higher layer, the first parameter set comprising multiple values.

In one embodiment, the first parameter is a value in a first parameter set; the first parameter set is configured by a higher layer, the first parameter set comprising multiple values; the first signaling in the present disclosure indicates an index of the first parameter in the first parameter set.

In one embodiment, the first parameter is a value in a first parameter set; the first parameter set is configured by a higher layer, the first parameter set comprising multiple values; the second signaling in the present disclosure indicates an index of the first parameter in the first parameter set.

In one embodiment, the first parameter is a smaller value between a second parameter and the size of the second bit block, the second parameter being configured by a higher layer.

In one embodiment, the first parameter is a smaller value between a second parameter and the size of the second bit block, the first signaling in the present disclosure indicating the second parameter.

In one embodiment, the first parameter is a smaller value between a second parameter and the size of the second bit block, the second signaling in the present disclosure indicating the second parameter.

In one embodiment, when the first identifier is the same as the second identifier, both the first identifier and the second identifier denote High Priority.

In one embodiment, when the first identifier is the same as the second identifier, both the first identifier and the second identifier denote Low Priority.

In one embodiment, when the first identifier is different from the second identifier, the first identifier denotes High Priority, and the second identifier denotes Low Priority.

In one embodiment, the second bit block comprises information (bit(s)) indicating whether a positive integer number of signal(s) other than the second signal of the present disclosure is(are) correctly received.

Embodiment 7

Figure 7:
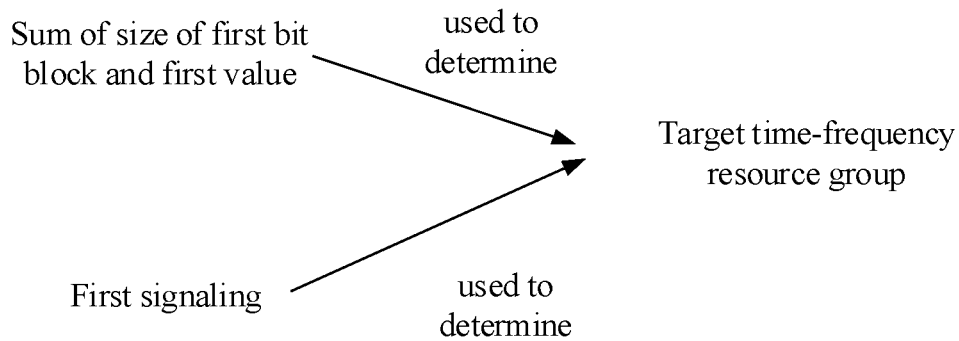
FIG. 7 illustrates a schematic diagram of relations among a sum of size of a first bit block and a first value, a first signaling, and a target time-frequency resource group according to one embodiment of the present disclosure.

Embodiment 7 illustrates a schematic diagram of relations among a sum of size of a first bit block and a first value, a first signaling, and a target time-frequency resource group according to one embodiment of the present disclosure, as shown in FIG. 7.

In Embodiment 7, a sum of size of the first bit block and a first value is used together with the first signaling to determine the target time-frequency resource group.

In one embodiment, the N time-frequency resource group sets in the present disclosure respectively correspond to N payload size ranges, and a sum of size of the first bit block and the first value belongs to a first payload size range, the first payload size range being one of the N payload size ranges, and the first time-frequency resource group set being one of the N time-frequency resource group sets that corresponds to the first payload size range; the first payload size range comprises a positive integer number of payload size (s), and any payload size in the first payload size range is a positive integer.

In one embodiment, the first signaling indicates an index of the target time-frequency resource group in the first time-frequency resource group set of the present disclosure.

In one embodiment, the sum of the size of the first bit block and the first value determines multiple candidate time-frequency resource groups, and the first signaling indicates the target time-frequency resource group from the multiple candidate time-frequency resource groups.

In one embodiment, the target time-frequency resource group is a PUCCH resource, and the specific definition of the PUCCH resource can be found in 3GPP TS38.213, section 9.2.1.

In one embodiment, each time-frequency resource group set of the N time-frequency resource group sets comprises at least one PUCCH resource.

Embodiment 8

Figure 8:
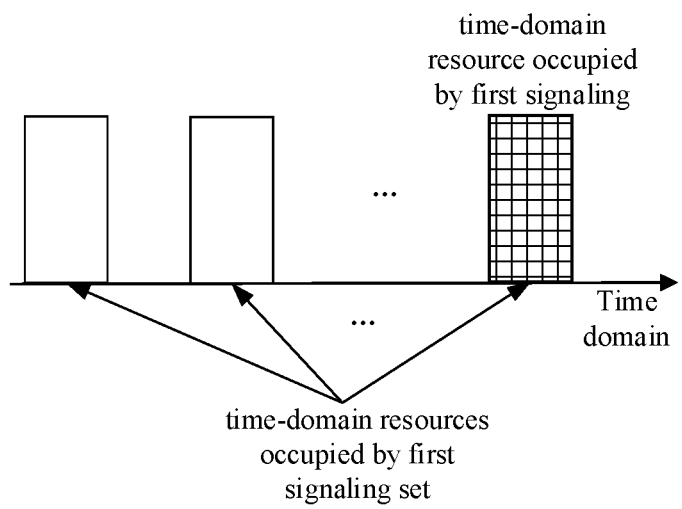
FIG. 8 illustrates a schematic diagram of a relation between a first signaling and a first signaling set according to one embodiment of the present disclosure.

Embodiment 8 illustrates a schematic diagram of a relation between a first signaling and a first signaling set according to one embodiment of the present disclosure, as shown in FIG. 8. In FIG. 8, the rectangular boxes represent time-domain resources occupied by the first signaling set, of which the box filled with vertical lines represents a time-domain resource occupied by the first signaling.

In Embodiment 8, the first identifier in the present disclosure is the same as the second identifier in the present disclosure.

In Embodiment 8, the first signaling is a last signaling in the first signaling set.

In one embodiment, all signalings in the first signaling set indicate a same time-domain resource block, and the time-domain resource block comprises time-domain resources occupied by the first time-frequency resource group in the present disclosure.

In one subembodiment, the time-domain resource block is a slot.

In one subembodiment, the time-domain resource block is a Mini-slot.

In one subembodiment, the time-domain resource block comprises a sub-slot.

In one subembodiment, the time-domain resource block comprises a positive integer number of OFDM symbol(s).

In one embodiment, each signaling comprised in the first signaling set indicates one of L time-domain resource blocks respectively, the L time-domain resource blocks are comprised in a time-domain resource unit, the time-domain resource unit comprising time-domain resources occupied by the first time-frequency resource group in the present disclosure.

In one subembodiment, the L time-domain resource blocks are respectively slots or mini-slots.

In one subembodiment, the L time-domain resource blocks respectively comprise a positive integer number of OFDM symbol(s).

In one subembodiment, the time-domain resource unit is a slot, and the L time-domain resource blocks are respectively slots or mini-slots.

In one subembodiment, the time-domain resource unit is a slot, and the L time-domain resource blocks respectively comprise a positive integer number of OFDM symbol(s).

In one embodiment, the phrase that the first signaling is a last signaling in a first signaling set includes the meaning that in view of time domain, a Monitoring Occasion of the first signaling is later than a Monitoring Occasion of any signaling in the first signaling set other than the first signaling.

In one embodiment, the phrase that the first signaling is a last signaling in a first signaling set includes the meaning that in view of time domain, a Monitoring Occasion of the first signaling is no earlier than a Monitoring Occasion of any signaling in the first signaling set other than the first signaling.

In one embodiment, the phrase that the first signaling is a last signaling in a first signaling set includes the meaning that in view of time domain, a last symbol of the first signaling is later than a last symbol of any signaling in the first signaling set other than the first signaling.

In one embodiment, the phrase that the first signaling is a last signaling in a first signaling set includes the meaning that in view of time domain, a last symbol of the first signaling is no earlier than a last symbol of any signaling in the first signaling set other than the first signaling.

In one embodiment, the phrase that the first signaling is a last signaling in a first signaling set includes the meaning that the first signaling set comprises multiple pieces of DCI, and the multiple pieces of DCI indicate a same PUCCH transmission time, the first signaling being a last piece of DCI in the first signaling set.

In one subembodiment, the phrase of transmission time comprises a slot where the transmission occurs.

In one subembodiment, the phrase of transmission time comprises a mini-slot where the transmission occurs.

In one embodiment, when the first identifier in the present disclosure is the same as the second identifier in the present disclosure, the first signaling set only comprises the first signaling and the second signaling.

In one embodiment, when the first identifier in the present disclosure is the same as the second identifier in the present disclosure, the first signaling set also comprises a signaling other than the first signaling and the second signaling.

In one embodiment, each signaling in the first signaling set is used to indicate High Priority.

In one embodiment, each signaling in the first signaling set is used to indicate Low Priority.

Embodiment 9

Figure 9:
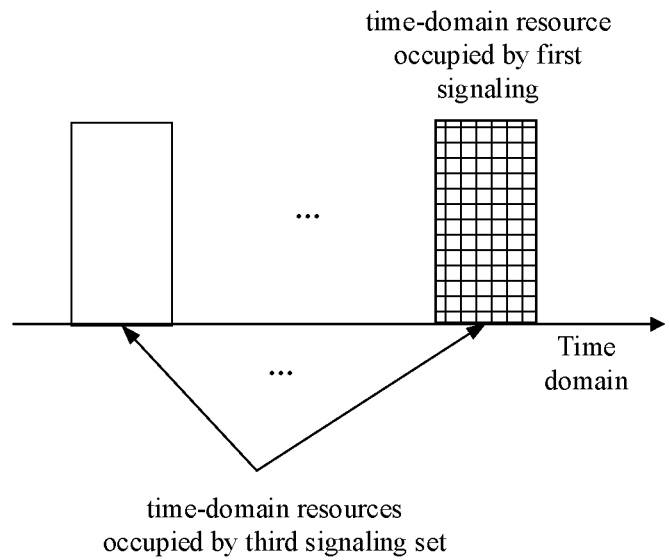
FIG. 9 illustrates a schematic diagram of a relation between a first signaling and a third signaling set according to one embodiment of the present disclosure.

Embodiment 9 illustrates a schematic diagram of a relation between a first signaling and a third signaling set according to one embodiment of the present disclosure, as shown in FIG. 9. The rectangular boxes, as exemplified in FIG. 9, represent time-domain resources occupied by the third signaling set, of which the box filled with vertical lines represents a time-domain resource occupied by the first signaling.

In Embodiment 9, the first identifier in the present disclosure is different from the second identifier in the present disclosure.

In Embodiment 9, the first signaling is a last signaling in the third signaling set.

In one embodiment, all signalings in the third signaling set indicate a same time-domain resource block, the time-domain resource block comprising time-domain resources occupied by the first time-frequency resource group in the present disclosure.

In one subembodiment, the time-domain resource block is a slot.

In one subembodiment, the time-domain resource block is a Mini-slot.

In one subembodiment, the time-domain resource block comprises a sub-slot.

In one subembodiment, the time-domain resource block comprises a positive integer number of OFDM symbol(s).

In one embodiment, the phrase that the first signaling is a last signaling in a third signaling set includes the meaning that in view of time domain, a Monitoring Occasion of the first signaling is later than a Monitoring Occasion of any signaling in the third signaling set other than the first signaling.

In one embodiment, the phrase that the first signaling is a last signaling in a third signaling set includes the meaning that in view of time domain, a Monitoring Occasion of the first signaling is no earlier than a Monitoring Occasion of any signaling in the third signaling set other than the first signaling.

In one embodiment, the phrase that the first signaling is a last signaling in a third signaling set includes the meaning that in view of time domain, a last symbol of the first signaling is later than a last symbol of any signaling in the third signaling set other than the first signaling.

In one embodiment, the phrase that the first signaling is a last signaling in a third signaling set includes the meaning that in view of time domain, a last symbol of the first signaling is no earlier than a last symbol of any signaling in the third signaling set other than the first signaling.

In one embodiment, the phrase that the first signaling is a last signaling in a third signaling set includes the meaning that the third signaling set comprises multiple pieces of DCI, and the multiple pieces of DCI indicate a same PUCCH transmission time, and also indicate a same priority, the first signaling being a last piece of DCI in the third signaling set.

In one subembodiment, the phrase of transmission time comprises a slot where the transmission occurs.

In one subembodiment, the phrase of transmission time comprises a mini-slot where the transmission occurs.

In one embodiment, when the first identifier in the present disclosure is different from the second identifier in the present disclosure, the third signaling set only comprises the first signaling.

In one embodiment, when the first identifier in the present disclosure is different from the second identifier in the present disclosure, the third signaling set also comprises a signaling other than the first signaling.

Embodiment 10

Figure 10:
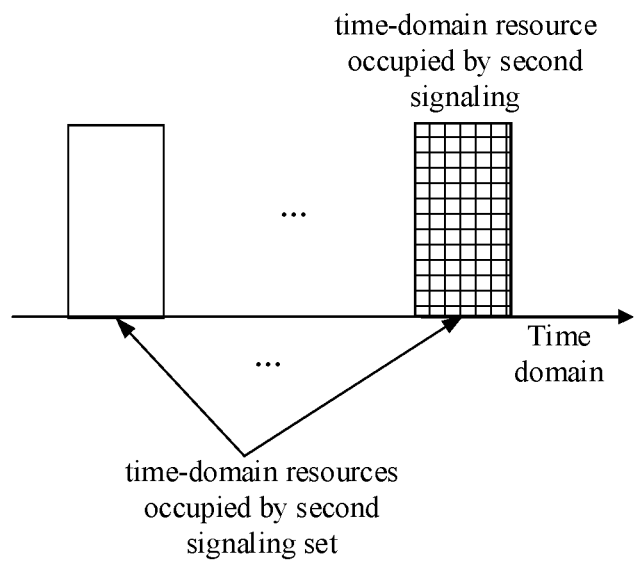
FIG. 10 illustrates a schematic diagram of a relation between a second signaling and a second signaling set according to one embodiment of the present disclosure.

Embodiment 10 illustrates a schematic diagram of a relation between a second signaling and a second signaling set according to one embodiment of the present disclosure, as shown in FIG. 10. The rectangular boxes, as exemplified in FIG. 10, represent time-domain resources occupied by the second signaling set, of which the box filled with vertical lines represents a time-domain resource occupied by the second signaling.

In Embodiment 10, the first identifier in the present disclosure is different from the second identifier in the present disclosure.

In Embodiment 10, the second signaling is a last signaling in the second signaling set.

In one embodiment, all signalings in the second signaling set indicate a same time-domain resource block, the time-domain resource block comprising time-domain resources occupied by the second time-frequency resource group in the present disclosure.

In one subembodiment, the time-domain resource block is a slot.

In one subembodiment, the time-domain resource block is a Mini-slot.

In one subembodiment, the time-domain resource block comprises a sub-slot.

In one subembodiment, the time-domain resource block comprises a positive integer number of OFDM symbol(s).

In one embodiment, the phrase that the second signaling is a last signaling in a second signaling set includes the meaning that in view of time domain, a Monitoring Occasion of the second signaling is later than a Monitoring Occasion of any signaling in the second signaling set other than the second signaling.

In one embodiment, the phrase that the second signaling is a last signaling in a second signaling set includes the meaning that in view of time domain, a Monitoring Occasion of the second signaling is no earlier than a Monitoring Occasion of any signaling in the second signaling set other than the second signaling.

In one embodiment, the phrase that the second signaling is a last signaling in a second signaling set includes the meaning that in view of time domain, a last symbol of the second signaling is later than a last symbol of any signaling in the second signaling set other than the second signaling.

In one embodiment, the phrase that the second signaling is a last signaling in a second signaling set includes the meaning that in view of time domain, a last symbol of the second signaling is no earlier than a last symbol of any signaling in the second signaling set other than the second signaling.

In one embodiment, the phrase that the second signaling is a last signaling in a second signaling set includes the meaning that the second signaling set comprises multiple pieces of DCI, and the multiple pieces of DCI indicate a same PUCCH transmission time, and also indicate a same priority, the second signaling being a last piece of DCI in the second signaling set.

In one subembodiment, the phrase of transmission time comprises a slot where the transmission occurs.

In one subembodiment, the phrase of transmission time comprises a mini-slot where the transmission occurs.

In one embodiment, when the first identifier in the present disclosure is different from the second identifier in the present disclosure, the second signaling set only comprises the second signaling.

In one embodiment, when the first identifier in the present disclosure is different from the second identifier in the present disclosure, the second signaling set also comprises a signaling other than the second signaling.

Embodiment 11

Figure 11:
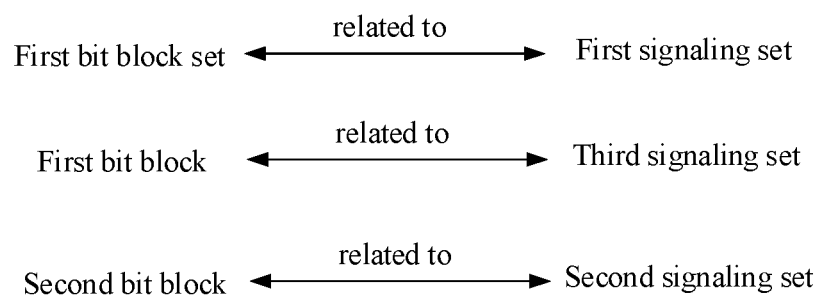
FIG. 11 illustrates a schematic diagram of a relation between a first bit block set and a first signaling set, a relation between a first bit block set and a third signaling set as well as a relation between a second bit block and a second signaling set according to one embodiment of the present disclosure.

Embodiment 11 illustrates a schematic diagram of a relation between a first bit block set and a first signaling set, a relation between a first bit block set and a third signaling set as well as a relation between a second bit block and a second signaling set according to one embodiment of the present disclosure, as shown in FIG. 11.

In Embodiment 11, when the first identifier in the present disclosure is the same as the second identifier in the present disclosure, the first bit block set is related to the first signaling set.

In Embodiment 11, when the first identifier is different from the second identifier, the first bit block is related to the third signaling set, and the second bit block is related to the second signaling set.

In one embodiment, the phrase that the first bit block set is related to the first signaling set includes the meaning that the first bit block set comprises K bit sub-blocks, and the first signaling set comprises K signalings, the K signalings respectively comprising scheduling information of the K bit sub-blocks.

In one subembodiment, the K bit sub-blocks respectively comprise a positive integer number of bit(s).

In one subembodiment, the K bit sub-blocks respectively comprise a positive integer number of HARQ-ACK(s).

In one subembodiment, the scheduling information comprises one or more of occupied time-domain resource, occupied frequency-domain resource, a Beta Offset, a Format or an Index of occupied resources.

In one embodiment, the phrase that the first bit block is related to the third signaling set includes the meaning that the first bit block comprises K1 bit sub-blocks, and the third signaling set comprises K1 signalings, the K1 signalings respectively comprising scheduling information of the K1 bit sub-blocks.

In one subembodiment, the K1 bit sub-blocks respectively comprise a positive integer number of bit(s).

In one subembodiment, the K1 bit sub-blocks respectively comprise a positive integer number of HARQ-ACK(s).

In one subembodiment, the scheduling information comprises one or more of occupied time-domain resource, occupied frequency-domain resource, a Beta Offset, a Format or an Index of occupied resources.

In one embodiment, the phrase that the second bit block is related to the second signaling set includes the meaning that the second bit block comprises K2 bit sub-blocks, and the second signaling set comprises K2 signalings, the K2 signalings respectively comprising scheduling information of the K2 bit sub-blocks.

In one subembodiment, the K2 bit sub-blocks respectively comprise a positive integer number of bit(s).

In one subembodiment, the K2 bit sub-blocks respectively comprise a positive integer number of HARQ-ACK(s).

In one subembodiment, the scheduling information comprises one or more of occupied time-domain resource, occupied frequency-domain resource, a Beta Offset, a Format or an Index of occupied resources.

In one embodiment, each signaling in the third signaling set is used to indicate High Priority.

In one embodiment, each signaling in the second signaling set is used to indicate Low Priority.

Embodiment 12

Figure 12:
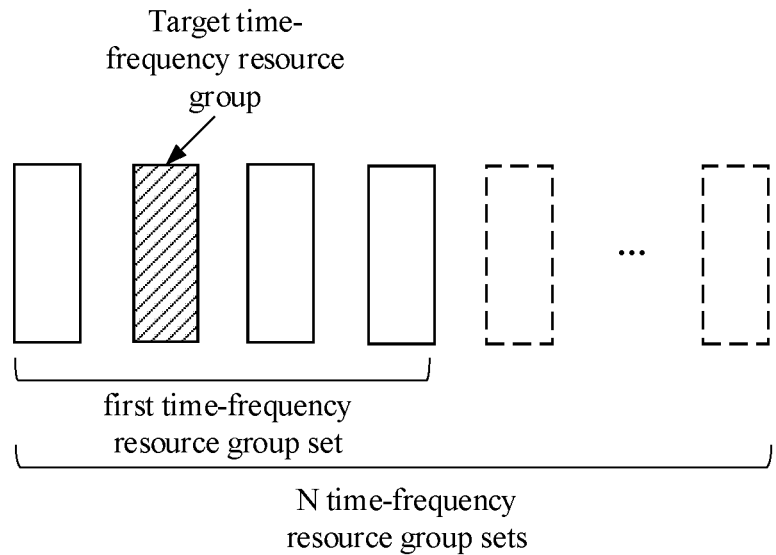
FIG. 12 illustrates a schematic diagram of relations among N time-frequency resource group sets, a first time-frequency resource group set and a target time-frequency resource group according to one embodiment of the present disclosure.

Embodiment 12 illustrates a schematic diagram of relations among N time-frequency resource group sets, a first time-frequency resource group set and a target time-frequency resource group according to one embodiment of the present disclosure, as shown in FIG. 12. In FIG. 12, rectangular boxes framed with solid lines represent the first time-frequency resource group set, of which the slash-filled box represents a target time-frequency resource group, while rectangular boxes framed with dotted lines represent time-frequency resource group set(s) of the N time-frequency resource group sets other than the first time-frequency resource group set; the solid-line boxes and the dotted-line boxes together represent the N time-frequency resource group sets.

In Embodiment 12, the first time-frequency resource group set comprises the target time-frequency resource group.

In one embodiment, the second information in the present disclosure explicitly indicates the N time-frequency resource group sets.

In one embodiment, the second information in the present disclosure implicitly indicates the N time-frequency resource group sets.

In one embodiment, the second information in the present disclosure comprises configuration information of each time-frequency resource group in the N time-frequency resource group sets.

In one embodiment, configuration information of any time-frequency resource group in the N time-frequency resource group sets comprises at least one of occupied time-domain resource, occupied code-domain resource, occupied frequency-domain resource or a corresponding antenna port group.

In one embodiment, configuration information of any time-frequency resource group in the N time-frequency resource group sets comprises occupied time-domain resource, occupied code-domain resource, occupied frequency-domain resource and a corresponding antenna port group.

In one embodiment, configuration information of any time-frequency resource group in the N time-frequency resource group sets comprises an initial multicarrier symbol occupied, a number of multicarrier symbols occupied, an initial Physical Resource Block (PRB) prior to or without frequency hopping, an initial PRB after frequency hopping, a number of PRBs occupied, settings of frequency hopping, a Cyclic Shift (CS), an Orthogonal Cover Code (OCC), an OCC length, a corresponding antenna port group and a maximum Code Rate.

In one embodiment, configuration information of any time-frequency resource group in the N time-frequency resource group sets comprises at least one of an initial multicarrier symbol occupied, a number of multicarrier symbols occupied, an initial Physical Resource Block (PRB) prior to or without frequency hopping, an initial PRB after frequency hopping, a number of PRBs occupied, settings of frequency hopping, a Cyclic Shift (CS), an Orthogonal Cover Code (OCC), an OCC length, a corresponding antenna port group or a maximum Code Rate.

In one embodiment, the N time-frequency resource group sets are respectively N PUCCH resource sets, and the specific definition of the PUCCH resource sets can be found in 3GPP TS38.213, section 9.2.1.

In one embodiment, the N time-frequency resource group sets respectively correspond to N payload size ranges.

In one embodiment, the N time-frequency resource group sets respectively correspond to N bit number ranges.

In one subembodiment, the N is equal to 4, and the N bit number ranges are [1,2], (2,N2], (N2,N3] and (N3,1706], respectively, N2 and N3 both being configured by a higher layer signaling.

In one subembodiment, the N is equal to 4, and the N bit number ranges are [1,2], (2,N2], (N2,N3] and [N3,1706], respectively, N2 and N3 both being configured by a higher layer signaling.

Embodiment 13

Figure 13:
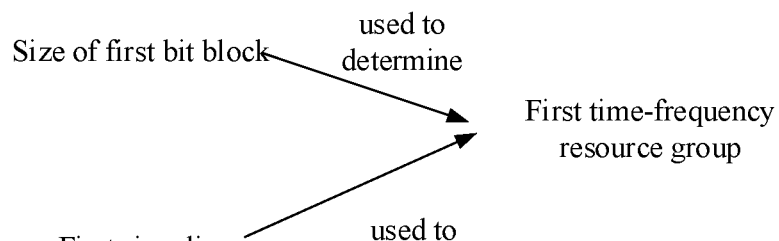
FIG. 13 illustrates a schematic diagram of relations among size of a first bit block, a first signaling and a first time-frequency resource group according to one embodiment of the present disclosure.

Embodiment 13 illustrates a schematic diagram of relations among size of a first bit block, a first signaling and a first time-frequency resource group according to one embodiment of the present disclosure, as shown in FIG. 13.

In Embodiment 13, the size of the first bit block and the first signaling are jointly used to determine the first time-frequency resource group.

In one embodiment, the first time-frequency resource group is a time-frequency resource group in a second time-frequency resource group set, and the second time-frequency resource group set corresponds to a second payload size range, the second payload size range being one of N payload size ranges, and the second time-frequency resource group set being one of the N time-frequency resource group sets in the present disclosure that corresponds to the second payload size range; the second payload size range comprises a positive integer number of payload size(s), any payload size in the second payload size range being a positive integer.

In one subembodiment, the size of the first bit block belongs to the second payload size range, and the first signaling indicates an index of the first time-frequency resource group in the second time-frequency resource group set.

In one subembodiment, the second payload size range is used to determine the first parameter in the present disclosure.

In one subembodiment, the second payload size range and the first information in the present disclosure are jointly used to determine the first parameter in the present disclosure.

In one subembodiment, a minimum payload size comprised by the second payload size range is used to determine the first parameter in the present disclosure.

In one subembodiment, a maximum payload size comprised by the second payload size range is used to determine the first parameter in the present disclosure.

In one embodiment, the size of the first bit block determines multiple candidate time-frequency resource groups, and the first signaling indicates the first time-frequency resource group from the multiple candidate time-frequency resource groups.

In one embodiment, the first time-frequency resource group is a PUCCH resource, and the specific definition of the PUCCH resource can be found in 3GPP TS38.213, section 9.2.1.

Embodiment 14

Figure 14:
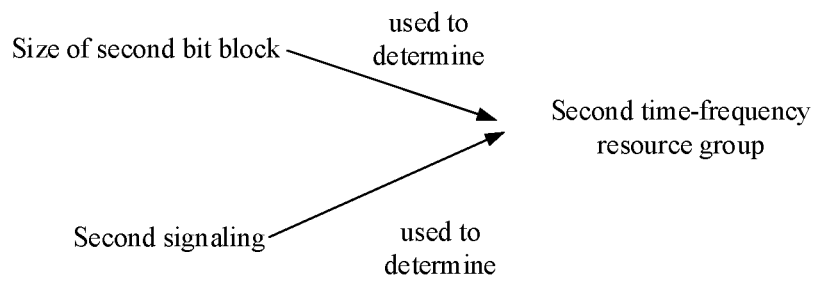
FIG. 14 illustrates a schematic diagram of relations among size of a second bit block, a second signaling and a second time-frequency resource group according to one embodiment of the present disclosure.

Embodiment 14 illustrates a schematic diagram of relations among size of a second bit block, a second signaling and a second time-frequency resource group according to one embodiment of the present disclosure, as shown in FIG. 14.

In Embodiment 14, the size of the second bit block and the second signaling are jointly used to determine the second time-frequency resource group.

In one embodiment, the second time-frequency resource group is a time-frequency resource group in a third time-frequency resource group set, and the third time-frequency resource group set corresponds to a third payload size range, the third payload size range being one of N payload size ranges, and the third time-frequency resource group set being one of the N time-frequency resource group sets that corresponds to the third payload size range; the third payload size range comprises a positive integer number of payload size(s), any payload size in the third payload size range being a positive integer.

In one subembodiment, the size of the second bit block belongs to the third payload size range, and the second signaling indicates an index of the second time-frequency resource group in the third time-frequency resource group set.

In one embodiment, the size of the second bit block determines multiple time-frequency resource groups, and the second signaling indicates the second time-frequency resource group from the multiple candidate time-frequency resource groups.

In one embodiment, the second time-frequency resource group is a PUCCH resource, and the specific definition of the PUCCH resource can be found in 3GPP TS38.213, section 9.2.1.

Embodiment 15

Figure 15:
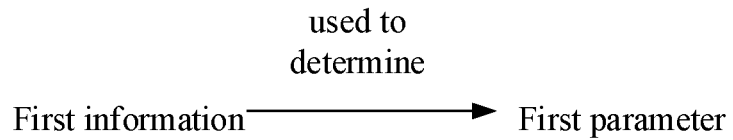
FIG. 15 illustrates a schematic diagram of a relation between first information and a first parameter according to one embodiment of the present disclosure.

Embodiment 15 illustrates a schematic diagram of a relation between first information and a first parameter according to one embodiment of the present disclosure, as shown in FIG. 15.

In Embodiment 15, the first information is used to determine the first parameter.

In one embodiment, the first information is used to indicate the first parameter.

In one embodiment, the first information explicitly indicates the first parameter.

In one embodiment, the first information implicitly indicates the first parameter.

In one embodiment, the size of the first bit block in the present disclosure is used to determine the first parameter.

In one embodiment, the size of the first bit block in the present disclosure is used together with the first information to determine the first parameter.

In one embodiment, the size of the first bit block in the present disclosure, the size of the second bit block in the present disclosure and the first information are jointly used to determine the first parameter.

In one embodiment, the first parameter is linear with the size of the first bit block.

In one embodiment, the first parameter is equal to a product of the size of the first bit block and a value being rounded to a nearest integer; the value is greater than 0.

In one subembodiment, the value is a default value.

In one subembodiment, the value is configured by a higher-layer signaling.

In one subembodiment, the value is configured by an RRC signaling.

In one subembodiment, the value is configured by a MAC CE signaling.

In one subembodiment, the phrase of being rounded to a nearest integer refers to being rounded up to a nearest integer.

In one subembodiment, the phrase of being rounded to a nearest integer refers to being rounded down to a nearest integer.

In one embodiment, the first information indicates a parameter set, and multiple number ranges respectively correspond to multiple parameters in the parameter set; the first parameter is one of the multiple parameters corresponding to one of the multiple number ranges to which the size of the first bit block belongs.

In one subembodiment, the correspondence relation between the multiple number ranges and the parameter set is pre-defined.

In one subembodiment, the correspondence relation between the multiple number ranges and the parameter set is configured by an RRC signaling.

In one subembodiment, the correspondence relation between the multiple number ranges and the parameter set is configured by a higher-layer signaling.

In one subembodiment, the correspondence relation between the multiple number ranges and the parameter set is configured by a MAC CE signaling.

Embodiment 16

Figure 16:
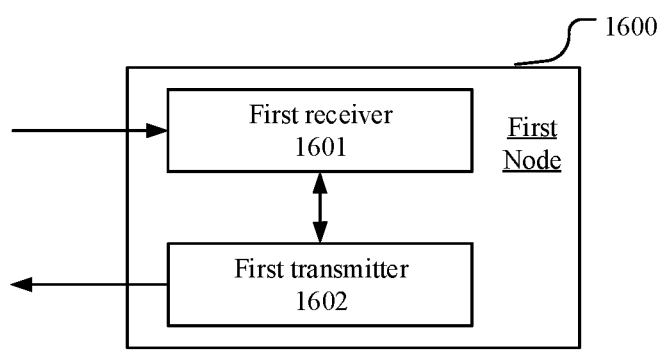
FIG. 16 illustrates a structure block diagram of a processing device in a first node according to one embodiment of the present disclosure.

Embodiment 16 illustrates a structure block diagram of a processing device in a first node according to one embodiment of the present disclosure, as shown in FIG. 16. In FIG. 16, a processing device 1600 in a first node comprises a first receiver 1601 and a first transmitter 1602.

In Embodiment 16, the first receiver 1601 receives a first signaling; the first receiver 1601 receives a first signal; the first receiver 1601 receives a second signaling; and the first receiver 1601 also receives a second signal; the first transmitter 1602 transmits a first bit block set in a target time-frequency resource group.

In Embodiment 16, the first signaling indicates scheduling information of the first signal, while the second signaling indicates scheduling information of the second signal; the first bit block set comprises a first bit block and a third bit block, the first bit block comprises information (bit(s)) indicating whether the first signal is correctly received, a second bit block comprises information (bit(s)) indicating whether the second signal is correctly received, and the second bit block is used to generate the third bit block; a sum of size of the first bit block and a first value is used together with the first signaling to determine the target time-frequency resource group; the first value is a first parameter, or, the first value is size of the second bit block; the first signaling is used to indicate a first identifier, while the second signaling is used to indicate a second identifier; whether the first identifier is the same as the second identifier is used to determine the first value.

In one embodiment, when the first identifier is the same as the second identifier, the first value is the size of the second bit block; when the first identifier is different from the second identifier, the first value is the first parameter.

In one embodiment, when the first identifier is the same as the second identifier, the first signaling is a last signaling in a first signaling set, and the first bit block set is related to the first signaling set, the first signaling set comprising the first signaling and the second signaling, and each signaling in the first signaling set being used to indicate the first identifier.

In one embodiment, when the first identifier is different from the second identifier, the first signaling is a last signaling in a third signaling set, and the second signaling is a last signaling in a second signaling set, the first bit block is related to the third signaling set, and the second bit block is related to the second signaling set, any signaling in the third signaling set not belonging to the second signaling set, each signaling in the third signaling set is used to indicate the first identifier, while each signaling in the second signaling set is used to indicate the second identifier, the third signaling set comprising a positive integer number of signaling(s), and the second signaling set comprising a positive integer number of signaling(s).

In one embodiment, when the first identifier is different from the second identifier, the first identifier indicates high priority, and the second identifier indicates low priority, the first signaling and the size of the first bit block are used to determine a first time-frequency resource group, while the second signaling and the size of the second bit block are used to determine a second time-frequency resource group, the first time-frequency resource group overlapping with the second time-frequency resource group in time domain.

In one embodiment, the first receiver 1601 receives first information; herein, the first information is used to determine the first parameter.

In one embodiment, the first receiver 1601 receives second information; herein, the second information is used to indicate N time-frequency resource group sets, and any one of the N time-frequency resource group sets comprises a positive integer number of time-frequency resource group(s), N being a positive integer greater than 1; the target time-frequency resource group is a time-frequency resource group in a first time-frequency resource group set, the first time-frequency resource group set being one of the N time-frequency resource group sets; a sum of the size of the first bit block and the first value is used to determine the first time-frequency resource group set out of the N time-frequency resource group sets, and the first signaling is used to indicate the target time-frequency resource group from the first time-frequency resource group set.

In one embodiment, the first identifier and the second identifier are the same and both denote Low Priority; the first signaling set comprises multiple pieces of DCI, the first signaling and the second signaling respectively being DCI in the first signaling set; the first bit block and the third bit block together comprise multiple HARQ feedbacks respectively corresponding to the multiple pieces of DCI comprised by the first signaling set; bit(s) comprised in the third bit block is(are) the same as bit(s) comprised in the second bit block; the first bit block and the third bit block are transmitted on a same PUCCH.

In one embodiment, the first identifier and the second identifier are the same and both denote High Priority; the first signaling set comprises multiple pieces of DCI, the first signaling and the second signaling respectively being DCI in the first signaling set; the first bit block and the third bit block together comprise multiple HARQ feedbacks respectively corresponding to the multiple pieces of DCI comprised by the first signaling set; bit(s) comprised in the third bit block is(are) the same as bit(s) comprised in the second bit block; the first bit block and the third bit block are transmitted on a same PUCCH.

In one embodiment, the first identifier denotes High Priority, while the second identifier denotes Low Priority; the third signaling set comprises multiple pieces of DCI, and the first signaling is a last piece of DCI in the third signaling set; the second signaling set comprises multiple pieces of DCI, and the second signaling is a last piece of DCI in the second signaling set; the first bit block comprises multiple HARQ feedbacks of High Priority respectively corresponding to the multiple pieces of DCI comprised in the third signaling set; the second bit block comprises multiple HARQ feedbacks of Low Priority respectively corresponding to the multiple pieces of DCI comprised in the second signaling set; the third bit block only comprises part of the multiple low-priority HARQ feedbacks comprised by the second bit block; the first bit block and the third bit block are transmitted on a same PUCCH.

In one embodiment, the first identifier denotes High Priority, while the second identifier denotes Low Priority; the third signaling set comprises multiple pieces of DCI, and the first signaling is a last piece of DCI in the third signaling set; the second signaling set comprises multiple pieces of DCI, and the second signaling is a last piece of DCI in the second signaling set; the first bit block comprises multiple HARQ feedbacks of High Priority respectively corresponding to the multiple pieces of DCI comprised in the third signaling set; the second bit block comprises multiple HARQ feedbacks of Low Priority respectively corresponding to the multiple pieces of DCI comprised in the second signaling set; the third bit block comprises a positive integer number of bit(s) generated through bundling of all or part of the low-priority HARQ feedbacks comprised by the second bit block; the first bit block and the third bit block are transmitted on a same PUCCH.

In one embodiment, the first identifier and the second identifier are the same and both denote Low Priority; the first signaling set comprises multiple pieces of DCI, the first signaling and the second signaling respectively being DCI in the first signaling set; the first bit block and the third bit block together comprise multiple HARQ feedbacks respectively corresponding to the multiple pieces of DCI comprised by the first signaling set; bit(s) comprised in the third bit block is(are) the same as bit(s) comprised in the second bit block; the first bit block and the third bit block are transmitted on a same PUSCH.

In one embodiment, the first identifier and the second identifier are the same and both denote High Priority; the first signaling set comprises multiple pieces of DCI, the first signaling and the second signaling respectively being DCI in the first signaling set; the first bit block and the third bit block together comprise multiple HARQ feedbacks respectively corresponding to the multiple pieces of DCI comprised by the first signaling set; bit(s) comprised in the third bit block is(are) the same as bit(s) comprised in the second bit block; the first bit block and the third bit block are transmitted on a same PUSCH.

In one embodiment, the first identifier denotes High Priority, while the second identifier denotes Low Priority; the third signaling set comprises multiple pieces of DCI, and the first signaling is a last piece of DCI in the third signaling set; the second signaling set comprises multiple pieces of DCI, and the second signaling is a last piece of DCI in the second signaling set; the first bit block comprises multiple HARQ feedbacks of High Priority respectively corresponding to the multiple pieces of DCI comprised in the third signaling set; the second bit block comprises multiple HARQ feedbacks of Low Priority respectively corresponding to the multiple pieces of DCI comprised in the second signaling set; the third bit block only comprises part of the multiple low-priority HARQ feedbacks comprised by the second bit block; the first bit block and the third bit block are transmitted on a same PUSCH.

In one embodiment, the first identifier denotes High Priority, while the second identifier denotes Low Priority; the third signaling set comprises multiple pieces of DCI, and the first signaling is a last piece of DCI in the third signaling set; the second signaling set comprises multiple pieces of DCI, and the second signaling is a last piece of DCI in the second signaling set; the first bit block comprises multiple HARQ feedbacks of High Priority respectively corresponding to the multiple pieces of DCI comprised in the third signaling set; the second bit block comprises multiple HARQ feedbacks of Low Priority respectively corresponding to the multiple pieces of DCI comprised in the second signaling set; the third bit block comprises a positive integer number of bit(s) generated through bundling of all or part of the low-priority HARQ feedbacks comprised by the second bit block; the first bit block and the third bit block are transmitted on a same PUSCH.

In one embodiment, the first node is a UE.

In one embodiment, the first node is a relay node.

In one embodiment, the first receiver 1601 comprises at least one of the antenna 420, the receiver 418, the receiving processor 470, the channel decoder 478, the controller/processor 475 or the memory 476 in Embodiment 4.

In one embodiment, the first transmitter 1602 comprises at least one of the antenna 420, the transmitter 418, the transmitting processor 416, the channel encoder 477, the controller/processor 475 or the memory 476 in Embodiment 4.

Embodiment 17

Figure 17:
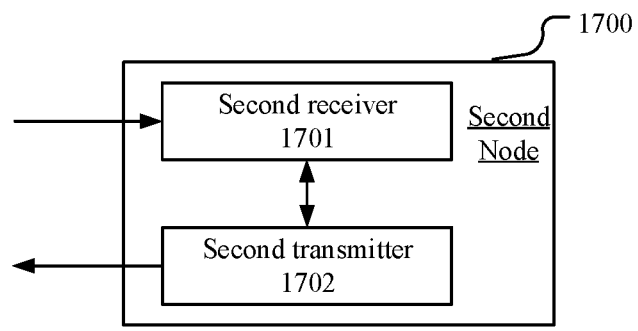
FIG. 17 illustrates a structure block diagram of a processing device in a second node according to one embodiment of the present disclosure.

Embodiment 17 illustrates a structure block diagram of a processing device in a second node according to one embodiment of the present disclosure, as shown in FIG. 17. In FIG. 17, a processing device 1700 in a second node comprises a second receiver 1701 and a second transmitter 1702.

In Embodiment 17, the second transmitter 1702 transmits a first signaling; the second transmitter 1702 transmits a first signal; the second transmitter 1702 transmits a second signaling; and the second transmitter 1702 also transmits a second signal; the second receiver 1701 receives a first bit block set in a target time-frequency resource group.

In Embodiment 17, the first signaling indicates scheduling information of the first signal, while the second signaling indicates scheduling information of the second signal; the first bit block set comprises a first bit block and a third bit block, the first bit block comprises information (bit(s)) indicating whether the first signal is correctly received, a second bit block comprises information (bit(s)) indicating whether the second signal is correctly received, and the second bit block is used to generate the third bit block; a sum of size of the first bit block and a first value is used together with the first signaling to determine the target time-frequency resource group; the first value is a first parameter, or, the first value is size of the second bit block; the first signaling is used to indicate a first identifier, while the second signaling is used to indicate a second identifier; whether the first identifier is the same as the second identifier is used to determine the first value.

In one embodiment, when the first identifier is the same as the second identifier, the first value is the size of the second bit block; when the first identifier is different from the second identifier, the first value is the first parameter.

In one embodiment, when the first identifier is the same as the second identifier, the first signaling is a last signaling in a first signaling set, and the first bit block set is related to the first signaling set, the first signaling set comprising the first signaling and the second signaling, and each signaling in the first signaling set being used to indicate the first identifier.

In one embodiment, when the first identifier is different from the second identifier, the first signaling is a last signaling in a third signaling set, and the second signaling is a last signaling in a second signaling set, the first bit block is related to the third signaling set, and the second bit block is related to the second signaling set, any signaling in the third signaling set not belonging to the second signaling set, each signaling in the third signaling set is used to indicate the first identifier, while each signaling in the second signaling set is used to indicate the second identifier, the third signaling set comprising a positive integer number of signaling(s), and the second signaling set comprising a positive integer number of signaling(s).

In one embodiment, when the first identifier is different from the second identifier, the first identifier indicates high priority, and the second identifier indicates low priority, the first signaling and the size of the first bit block are used to determine a first time-frequency resource group, while the second signaling and the size of the second bit block are used to determine a second time-frequency resource group, the first time-frequency resource group overlapping with the second time-frequency resource group in time domain.

In one embodiment, the second transmitter 1702 transmits first information; herein, the first information is used to determine the first parameter.

In one embodiment, the second transmitter 1702 transmits second information; herein, the is used to indicate N time-frequency resource group sets, and any one of the N time-frequency resource group sets comprises a positive integer number of time-frequency resource group(s), N being a positive integer greater than 1; the target time-frequency resource group is a time-frequency resource group in a first time-frequency resource group set, the first time-frequency resource group set being one of the N time-frequency resource group sets; a sum of the size of the first bit block and the first value is used to determine the first time-frequency resource group set out of the N time-frequency resource group sets, and the first signaling is used to indicate the target time-frequency resource group from the first time-frequency resource group set.

In one embodiment, the second node is a UE.

In one embodiment, the second node is a relay node.

In one embodiment, the second node is a base station.

In one embodiment, the second receiver 1701 comprises at least one of the antenna 452, the receiver 454, the receiving processor 456, the multi-antenna receiving processor 458, the controller/processor 459, the memory 460 or the data source 467 in Embodiment 4.

In one embodiment, the second transmitter 1702 comprises at least one of the antenna 452, the transmitter 454, the transmitting processor 468, the multi-antenna transmitting processor 457, the controller/processor 459, the memory 460 or the data source 467 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, which receives a first signaling; receives a first signal; receives a second signaling; and receives a second signal; and
a first transmitter, which transmits a first bit block set in a target time-frequency resource group;
wherein the first signaling indicates scheduling information of the first signal, while the second signaling indicates scheduling information of the second signal; the first bit block set comprises a first bit block and a third bit block, the first bit block comprises information (bit(s)) indicating whether the first signal is correctly received, a second bit block comprises information (bit(s)) indicating whether the second signal is correctly received, and the second bit block is used to generate the third bit block; a sum of size of the first bit block and a first value is used together with the first signaling to determine the target time-frequency resource group; the first value is a first parameter, or, the first value is size of the second bit block; the first signaling is used to indicate a first identifier, while the second signaling is used to indicate a second identifier; whether the first identifier is the same as the second identifier is used to determine the first value; when the first identifier is the same as the second identifier, the first value is the size of the second bit block; when the first identifier is different from the second identifier, the first value is the first parameter.

2. The first node according to claim 1, wherein when the first identifier is the same as the second identifier, the first signaling is a last signaling in a first signaling set, and the first bit block set is related to the first signaling set, the first signaling set comprising the first signaling and the second signaling, and each signaling in the first signaling set being used to indicate the first identifier;
or,
wherein when the first identifier is different from the second identifier, the first signaling is a last signaling in a third signaling set, and the second signaling is a last signaling in a second signaling set, the first bit block is related to the third signaling set, and the second bit block is related to the second signaling set, any signaling in the third signaling set not belonging to the second signaling set, each signaling in the third signaling set is used to indicate the first identifier, while each signaling in the second signaling set is used to indicate the second identifier, the third signaling set comprising a positive integer number of signaling(s), and the second signaling set comprising a positive integer number of signaling(s);
or,
wherein when the first identifier is different from the second identifier, the first identifier indicates high priority, and the second identifier indicates low priority, the first signaling and the size of the first bit block are used to determine a first time-frequency resource group, while the second signaling and the size of the first bit block are used to determine a second time-frequency resource group, the first time-frequency resource group overlapping with the second time-frequency resource group in time domain.

3. The first node according to claim 1, comprising:
the first receiver, which receives first information;
wherein the first information is used to determine the first parameter;
or, comprising:
the first receiver, which receives first information;
wherein the size of the first bit block and the first information are jointly used to determine the first parameter.

4. The first node according to claim 1, wherein the size of the first bit block is used to determine the first parameter;
or,
wherein the first parameter is a smaller value between a second parameter and the size of the second bit block, and the second parameter is configured by a higher-layer signaling or indicated by the first signaling or indicated by the second signaling;
or,
wherein the first parameter is a value in a first parameter set; the first parameter set is configured by a higher-layer signaling, and the first parameter set comprises multiple values; the first signaling or the second signaling indicates an index of the first parameter in the first parameter set.

5. The first node according to claim 1, wherein the first signaling is used to indicate a Modulation and Coding Scheme (MCS) employed by the first signal in a first MCS set; the first MCS set comprises a positive integer number of MCS(s); the second signaling is used to indicate an MCS employed by the second signal in a second MCS set; the second signal employs a second MCS, and the second MCS set comprises a positive integer number of MCS(s); a target BLER of the first MCS set is smaller than a target BLER of the second MCS set.

6. The first node according to claim 1, comprising:
the first receiver, which receives second information;
wherein the second information is used to indicate N time-frequency resource group sets, and any one of the N time-frequency resource group sets comprises a positive integer number of time-frequency resource group(s), N being a positive integer greater than 1; the target time-frequency resource group is a time-frequency resource group in a first time-frequency resource group set, the first time-frequency resource group set being one of the N time-frequency resource group sets; a sum of the size of the first bit block and the first value is used to determine the first time-frequency resource group set out of the N time-frequency resource group sets, and the first signaling is used to indicate the target time-frequency resource group from the first time-frequency resource group set.

7. A second node for wireless communications, comprising:
a second transmitter, which transmits a first signaling; transmits a first signal; transmits a second signaling; and transmits a second signal;
a second receiver, which receives a first bit block set in a target time-frequency resource group;
wherein the first signaling indicates scheduling information of the first signal, while the second signaling indicates scheduling information of the second signal; the first bit block set comprises a first bit block and a third bit block, the first bit block comprises information (bit(s)) indicating whether the first signal is correctly received, a second bit block comprises information (bit(s)) indicating whether the second signal is correctly received, and the second bit block is used to generate the third bit block; a sum of size of the first bit block and a first value is used together with the first signaling to determine the target time-frequency resource group; the first value is a first parameter, or, the first value is size of the second bit block; the first signaling is used to indicate a first identifier, while the second signaling is used to indicate a second identifier; whether the first identifier is the same as the second identifier is used to determine the first value; when the first identifier is the same as the second identifier, the first value is the size of the second bit block; when the first identifier is different from the second identifier, the first value is the first parameter.

8. The second node according to claim 7, wherein when the first identifier is the same as the second identifier, the first signaling is a last signaling in a first signaling set, and the first bit block set is related to the first signaling set, the first signaling set comprising the first signaling and the second signaling, and each signaling in the first signaling set being used to indicate the first identifier;
or,
wherein when the first identifier is different from the second identifier, the first signaling is a last signaling in a third signaling set, and the second signaling is a last signaling in a second signaling set, the first bit block is related to the third signaling set, and the second bit block is related to the second signaling set, any signaling in the third signaling set not belonging to the second signaling set, each signaling in the third signaling set is used to indicate the first identifier, while each signaling in the second signaling set is used to indicate the second identifier, the third signaling set comprising a positive integer number of signaling(s), and the second signaling set comprising a positive integer number of signaling(s);
or,
wherein when the first identifier is different from the second identifier, the first identifier indicates high priority, and the second identifier indicates low priority, the first signaling and the size of the first bit block are used to determine a first time-frequency resource group, while the second signaling and the size of the first bit block are used to determine a second time-frequency resource group, the first time-frequency resource group overlapping with the second time-frequency resource group in time domain.

9. The second node according to claim 7, comprising:
the second transmitter, which transmits first information;
wherein the first information is used to determine the first parameter;
or, comprising:
the second transmitter, which transmits first information;
wherein the size of the first bit block and the first information are jointly used to determine the first parameter.

10. The second node according to claim 7, wherein the size of the first bit block is used to determine the first parameter;
or,
wherein the first parameter is a smaller value between a second parameter and the size of the second bit block, and the second parameter is configured by a higher-layer signaling or indicated by the first signaling or indicated by the second signaling;
or,
wherein the first parameter is a value in a first parameter set; the first parameter set is configured by a higher-layer signaling, and the first parameter set comprises multiple values; the first signaling or the second signaling indicates an index of the first parameter in the first parameter set.

11. The second node according to claim 7, comprising:
the second transmitter, which transmits second information;
wherein the second information is used to indicate N time-frequency resource group sets, and any one of the N time-frequency resource group sets comprises a positive integer number of time-frequency resource group(s), N being a positive integer greater than 1; the target time-frequency resource group is a time-frequency resource group in a first time-frequency resource group set, the first time-frequency resource group set being one of the N time-frequency resource group sets; a sum of the size of the first bit block and the first value is used to determine the first time-frequency resource group set out of the N time-frequency resource group sets, and the first signaling is used to indicate the target time-frequency resource group from the first time-frequency resource group set.

12. A method in a first node for wireless communications, comprising:
receiving a first signaling; receiving a first signal; receiving a second signaling; and
receiving a second signal; and
transmitting a first bit block set in a target time-frequency resource group;
wherein the first signaling indicates scheduling information of the first signal, while the second signaling indicates scheduling information of the second signal; the first bit block set comprises a first bit block and a third bit block, the first bit block comprises information (bit(s)) indicating whether the first signal is correctly received, a second bit block comprises information (bit(s)) indicating whether the second signal is correctly received, and the second bit block is used to generate the third bit block; a sum of size of the first bit block and a first value is used together with the first signaling to determine the target time-frequency resource group; the first value is a first parameter, or, the first value is size of the second bit block; the first signaling is used to indicate a first identifier, while the second signaling is used to indicate a second identifier; whether the first identifier is the same as the second identifier is used to determine the first value; when the first identifier is the same as the second identifier, the first value is the size of the second bit block; when the first identifier is different from the second identifier, the first value is the first parameter.

13. The method in the first node according to claim 12, wherein when the first identifier is the same as the second identifier, the first signaling is a last signaling in a first signaling set, and the first bit block set is related to the first signaling set, the first signaling set comprising the first signaling and the second signaling, and each signaling in the first signaling set being used to indicate the first identifier;

or, wherein when the first identifier is different from the second identifier, the first signaling is a last signaling in a third signaling set, and the second signaling is a last signaling in a second signaling set, the first bit block is related to the third signaling set, and the second bit block is related to the second signaling set, any signaling in the third signaling set not belonging to the second signaling set, each signaling in the third signaling set is used to indicate the first identifier, while each signaling in the second signaling set is used to indicate the second identifier, the third signaling set comprising a positive integer number of signaling(s), and the second signaling set comprising a positive integer number of signaling(s);

or, wherein when the first identifier is different from the second identifier, the first identifier indicates high priority, and the second identifier indicates low priority, the first signaling and the size of the first bit block are used to determine a first time-frequency resource group, while the second signaling and the size of the first bit block are used to determine a second time-frequency resource group, the first time-frequency resource group overlapping with the second time-frequency resource group in time domain.

14. The method in the first node according to claim 12, comprising:
receiving first information;
wherein the first information is used to determine the first parameter;
or, comprising:
receiving first information;
wherein the size of the first bit block and the first information are jointly used to determine the first parameter.

15. The method in the first node according to claim 12, wherein the size of the first bit block is used to determine the first parameter;

or, wherein the first parameter is a smaller value between a second parameter and the size of the second bit block, and the second parameter is configured by a higher-layer signaling or indicated by the first signaling or indicated by the second signaling;

or, wherein the first parameter is a value in a first parameter set; the first parameter set is configured by a higher-layer signaling, and the first parameter set comprises multiple values; the first signaling or the second signaling indicates an index of the first parameter in the first parameter set.

16. The method in the first node according to claim 12, wherein the first signaling is used to indicate a Modulation and Coding Scheme (MCS) employed by the first signal in a first MCS set; the first MCS set comprises a positive integer number of MCS(s); the second signaling is used to indicate an MCS employed by the second signal in a second MCS set; the second signal employs a second MCS, and the second MCS set comprises a positive integer number of MCS(s); a target BLER of the first MCS set is smaller than a target BLER of the second MCS set.

17. The method in the first node according to claim 12, comprising:
receiving second information;
wherein the second information is used to indicate N time-frequency resource group sets, and any one of the N time-frequency resource group sets comprises a positive integer number of time-frequency resource group(s), N being a positive integer greater than 1; the target time-frequency resource group is a time-frequency resource group in a first time-frequency resource group set, the first time-frequency resource group set being one of the N time-frequency resource group sets; a sum of the size of the first bit block and the first value is used to determine the first time-frequency resource group set out of the N time-frequency resource group sets, and the first signaling is used to indicate the target time-frequency resource group from the first time-frequency resource group set.

* * * * *